US010869363B2

(12) United States Patent
Shan et al.

(10) Patent No.: US 10,869,363 B2
(45) Date of Patent: Dec. 15, 2020

(54) USER EQUIPMENT (UE), EVOLVED NODE-B (ENB) AND METHODS OF PAGING IN ACCORDANCE WITH A RELAY ARRANGEMENT

(71) Applicant: Apple Inc., Cupertino, CA (US)

(72) Inventors: Changhong Shan, Portland, OR (US); Alexandre Saso Stojanovski, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/487,778

(22) PCT Filed: Feb. 15, 2018

(86) PCT No.: PCT/US2018/018375
§ 371 (c)(1),
(2) Date: Aug. 21, 2019

(87) PCT Pub. No.: WO2018/164821
PCT Pub. Date: Sep. 13, 2018

(65) Prior Publication Data
US 2020/0245407 A1    Jul. 30, 2020

Related U.S. Application Data

(60) Provisional application No. 62/469,990, filed on Mar. 10, 2017, provisional application No. 62/477,609, (Continued)

(51) Int. Cl.
*H04W 88/04*    (2009.01)
*H04W 76/11*    (2018.01)
(Continued)

(52) U.S. Cl.
CPC ......... *H04W 88/04* (2013.01); *H04L 61/6054* (2013.01); *H04W 8/183* (2013.01); (Continued)

(58) Field of Classification Search
CPC ... H04L 61/6054; H04W 76/11; H04W 88/04; H04W 8/183; H04W 68/005
See application file for complete search history.

(56) References Cited

U.S. PATENT DOCUMENTS

2015/0009864 A1\* 1/2015 Kim .................... H04W 12/007
370/259
2016/0212108 A1\* 7/2016 Stojanovski ...... H04W 12/0401
(Continued)

FOREIGN PATENT DOCUMENTS

EP          3125643 A1     2/2017
KR    102016013892 A     12/2016

OTHER PUBLICATIONS

"International Application Serial No. PCT/US2018/018375, International Search Report dated May 28, 2018", 3 pgs.
(Continued)

*Primary Examiner* — Asad M Nawaz
*Assistant Examiner* — Syed Ali
(74) *Attorney, Agent, or Firm* — Kowert, Hood, Munyon, Rankin & Goetzel, P C.

(57) ABSTRACT

Embodiments of a User Equipment (UE), an Evolved Node-B (eNB) and methods for communication are generally described herein. An UE may be configurable to operate as an eRelay UE. The eRelay UE may be configured to operate as a relay between an eNB and an eRemote UE. The eRelay UE may receive, from the eRemote UE, a message that includes an identifier of the eRemote UE for paging of the eRemote UE. The eRelay UE may determine whether a first paging message from the eNB includes the identifier of the eRemote UE. If it is determined that the first paging message includes the identifier of the eRemote UE, the eRelay UE may transmit, to the eRemote UE, a second
(Continued)

paging message to page the eRemote UE. The second paging message includes the identifier of the eRemote UE.

20 Claims, 16 Drawing Sheets

Related U.S. Application Data filed on Mar. 28, 2017, provisional application No. 62/476,094, filed on Mar. 24, 2017, provisional application No. 62/485,758, filed on Apr. 14, 2017.

(51) Int. Cl.
  *H04L 29/12*  (2006.01)
  *H04W 8/18*  (2009.01)
  *H04W 68/00*  (2009.01)
  *H04W 92/18*  (2009.01)
(52) U.S. Cl.
  CPC .......... *H04W 68/005* (2013.01); *H04W 76/11* (2018.02); *H04W 92/18* (2013.01)

(56) References Cited

U.S. PATENT DOCUMENTS

| | | | | |
|---|---|---|---|---|
| 2016/0338094 A1* | 11/2016 | Faurie | ................ | H04W 72/085 |
| 2016/0338095 A1* | 11/2016 | Faurie | ............... | H04W 28/0278 |
| 2017/0086114 A1* | 3/2017 | Jung | ..................... | H04W 52/46 |
| 2018/0160325 A1* | 6/2018 | Cheng | ................... | H04W 76/14 |
| 2018/0295497 A1* | 10/2018 | Kim | ...................... | H04W 60/04 |
| 2019/0045574 A1* | 2/2019 | Feng | ..................... | H04W 76/12 |
| 2019/0357101 A1* | 11/2019 | Stojanovski | .......... | H04W 36/30 |

OTHER PUBLICATIONS

"International Application Serial No. PCT/US2018/018375, Written Opinion dated May 28, 2018", 10 pgs.
"Mobility type support for multiple beams in NR", Intel Corporation, R2-168512, 3GPP TSG RAN WG2 Meeting #96, Reno, USA, (Nov. 5, 2016), 6 pgs.
"Pairing—Fast connection setup between Relay and Remote UE", SONY, S2-170636, 3GPP TSG SA WG2 Meeting #118-bis, Spokane, USA, (Jan. 23, 2017), 1-3.
Huawei, et al., "Procedures for remote or relay UE in idle mode", R2-167880, 3GPP TSG RAN WG2 Meeting #96, Reno, USA, (Nov. 5, 2016), 7 pgs.

* cited by examiner

USER EQUIPMENT (UE), EVOLVED NODE-B (ENB) AND METHODS OF PAGING IN ACCORDANCE WITH A RELAY ARRANGEMENT

PRIORITY CLAIM

This application is a U.S. National Stage Filing under 35 U.S.C. 371 from International Application No. PCT/US2018/018375, filed Feb. 15, 2018 and published in English as WO 2018/164821 on Sep. 13, 2018, which claims priority to U.S. Provisional Patent Application Ser. No. 62/469,990, filed Mar. 10, 2017, and to U.S. Provisional Patent Application Ser. No. 62/476,094, filed Mar. 24, 2017, and to U.S. Provisional Patent Application Ser. No. 62/477,609, filed Mar. 28, 2017, and to U.S. Provisional Patent Application Ser. No. 62/485,758, filed Apr. 14, 2017, all of which are incorporated herein by reference in their entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to relays, including layer-2 relays. Some embodiments relate to paging.

BACKGROUND

Base stations and mobile devices operating in a cellular network may exchange data. Various techniques may be used to improve capacity and/or performance, in some cases, including communication in accordance with new radio (NR) techniques. In an example, a mobile device at a cell edge may experience performance degradation and may benefit from a relay with another mobile device. An overall benefit to the system may also be realized as a result of the relay. Accordingly, there is a general need for methods and systems to perform operations related to handover in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
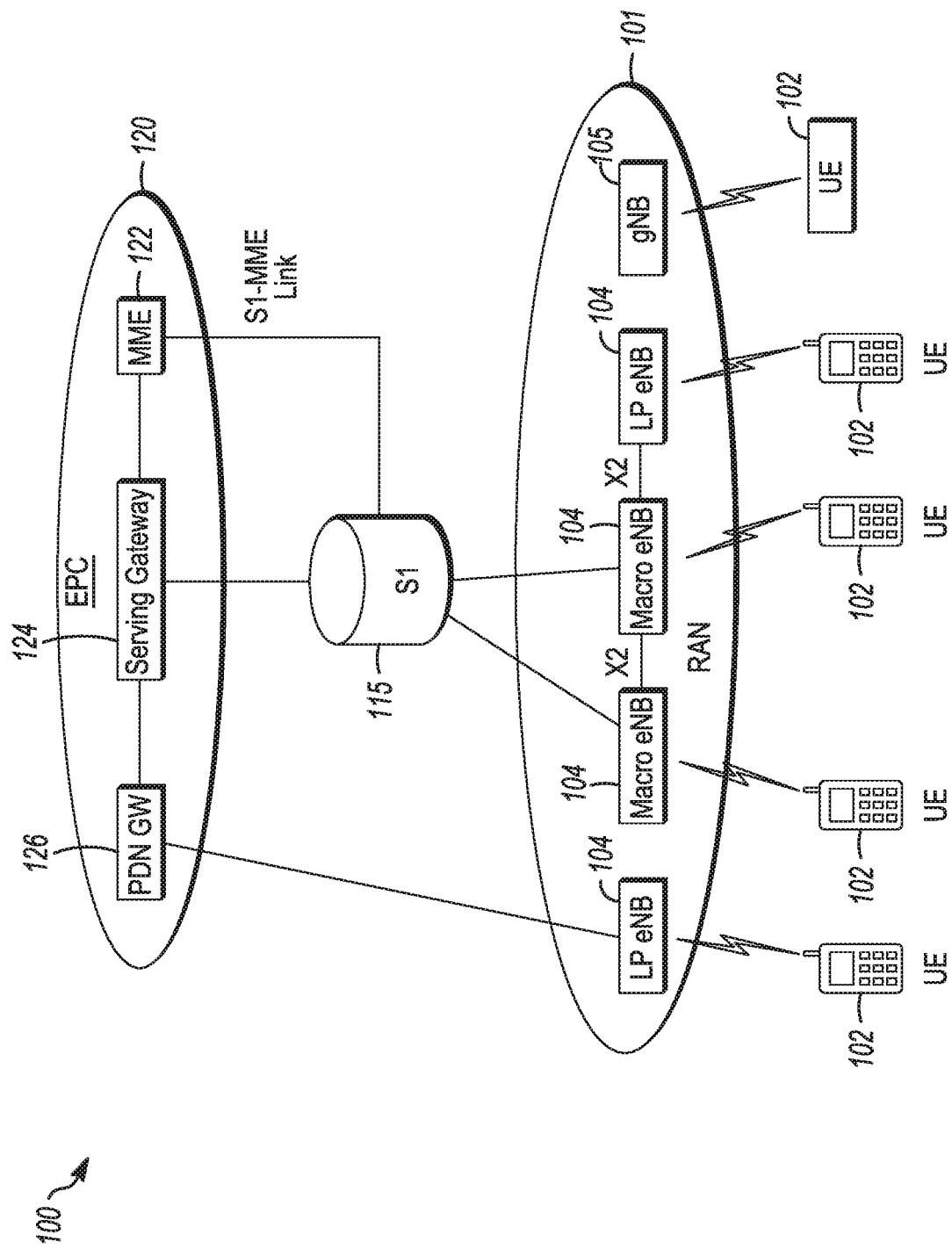
FIG. 1A is a functional diagram of an example network in accordance with some embodiments.
Figure 1B:
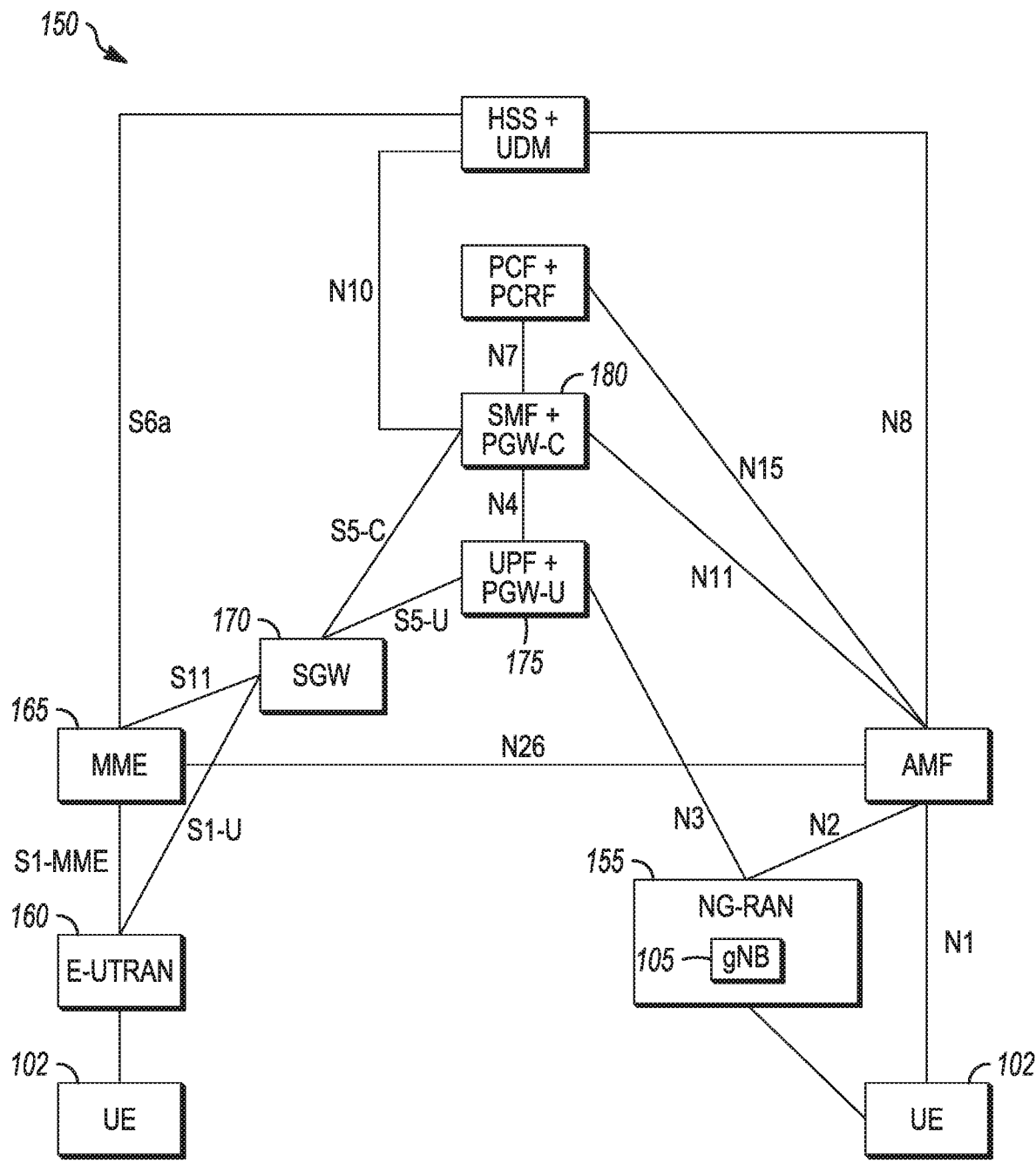
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175, some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
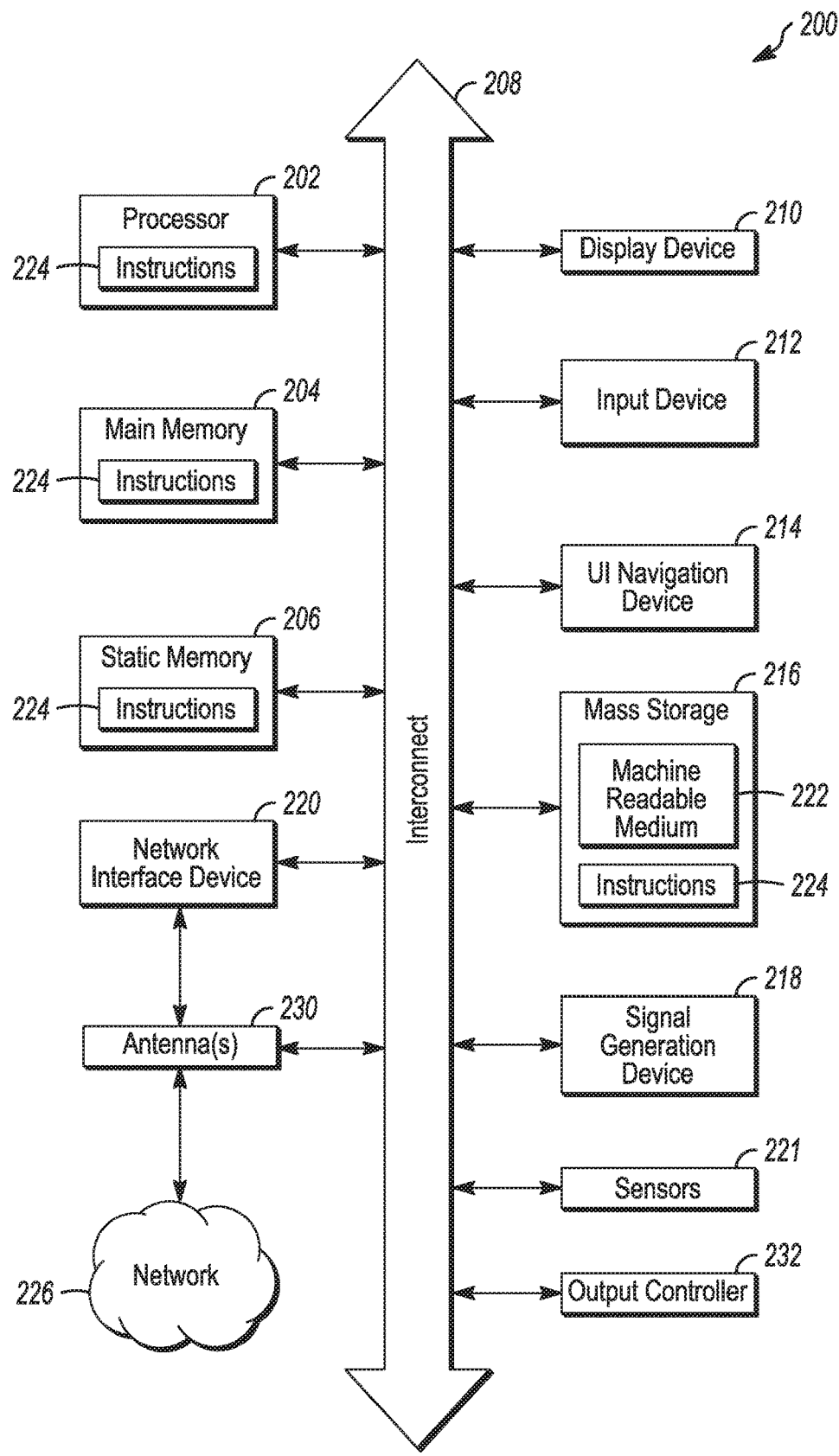
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
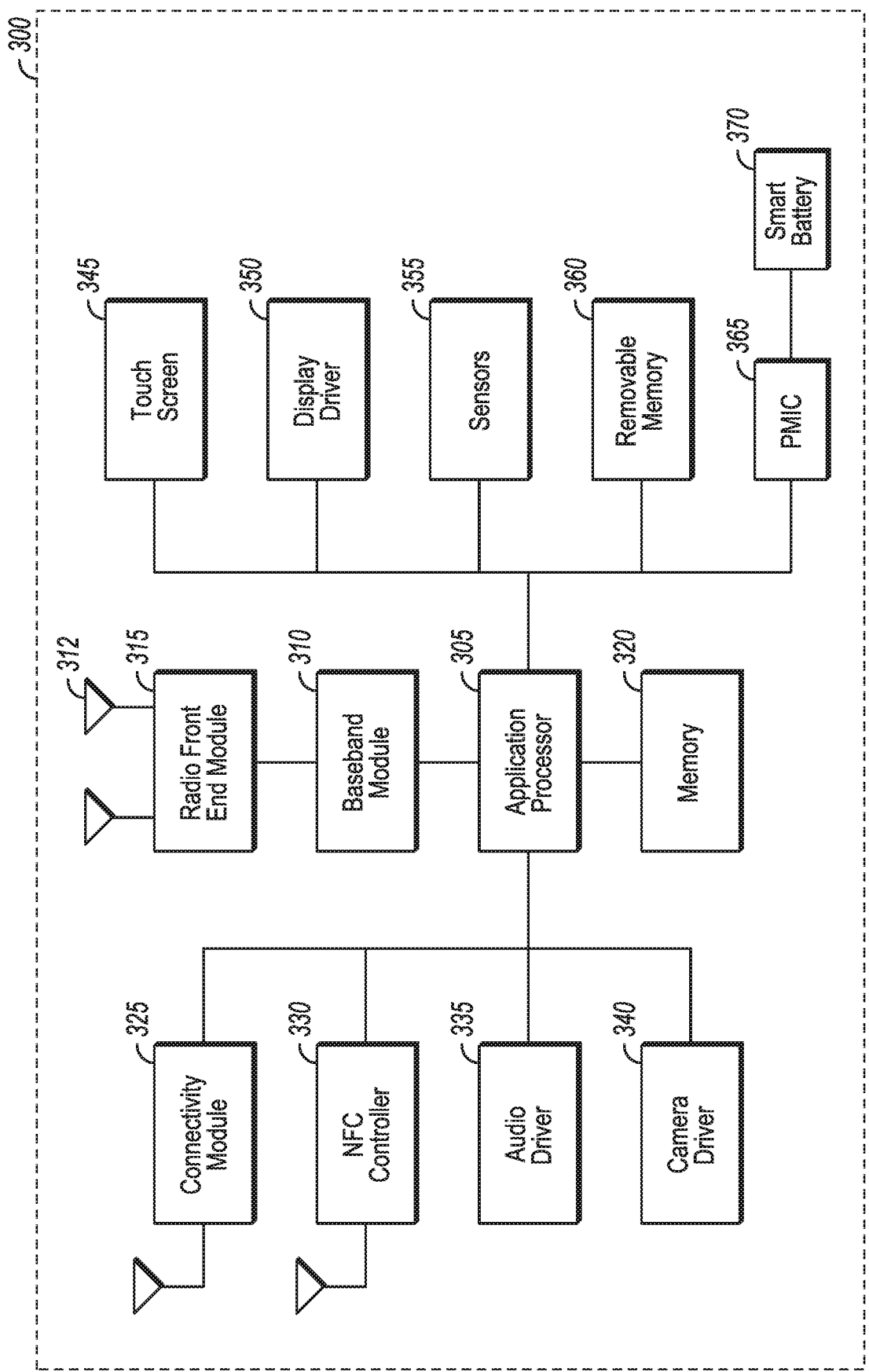
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I$^2$C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
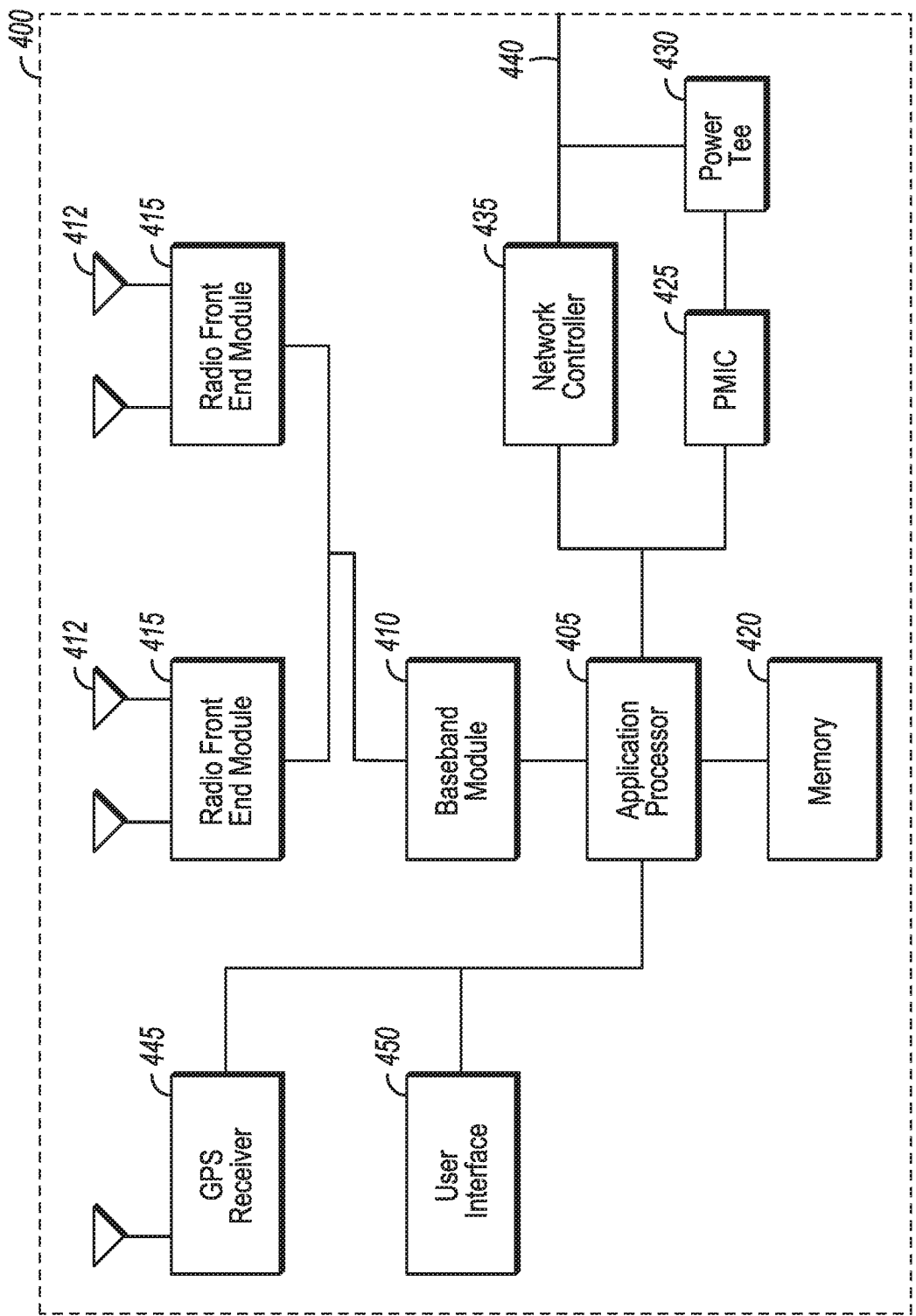
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400X may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I$^2$C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
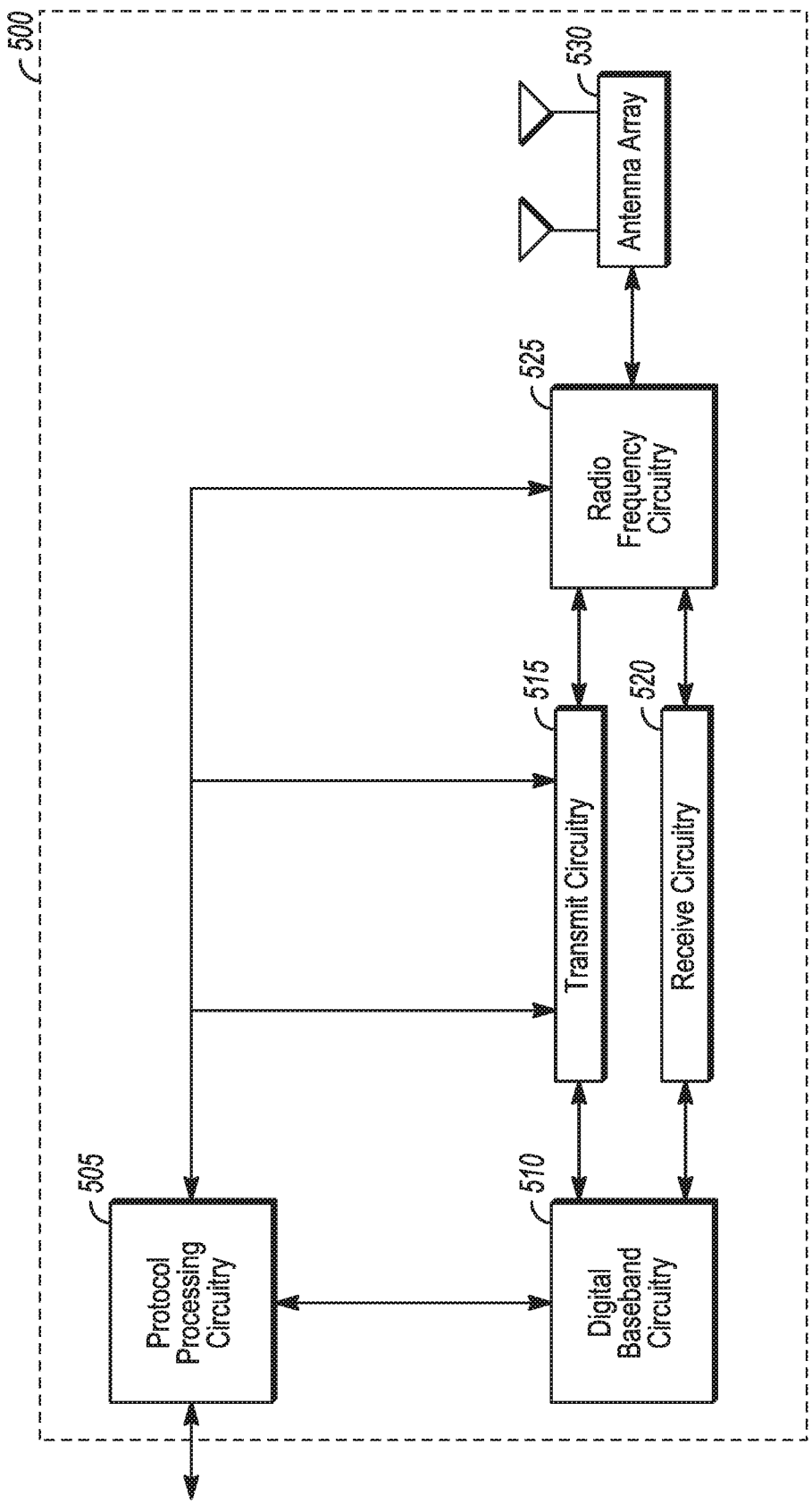
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500) may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 40X), machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

In accordance with some embodiments, a UE 102 may be configurable to operate as an eRelay UE 102. The eRelay UE 102 may receive, from an eRemote UE 102, a PC5 request message for an establishment of a relay arrangement in which the eRelay UE 102 is to operate as a relay between an Evolved Node-B (eNB) 104 and the eRemote UE 102. The eRelay UE 102 may receive, from the eRemote UE 102, an eRemote UE ID notification message that includes an identifier of the eRemote UE 102 for paging of the eRemote UE 102. The eRelay UE 102 may determine whether a first paging message from the eNB 104 includes the identifier of the eRemote UE 102. If it is determined that the first paging message includes the identifier of the eRemote UE 102, the eRelay UE 102 may transmit, to the eRemote UE 102, a second paging message to page the eRemote UE 102. The second paging message may include the identifier of the eRemote UE 102. These embodiments are described in more detail below.

Figure 6:
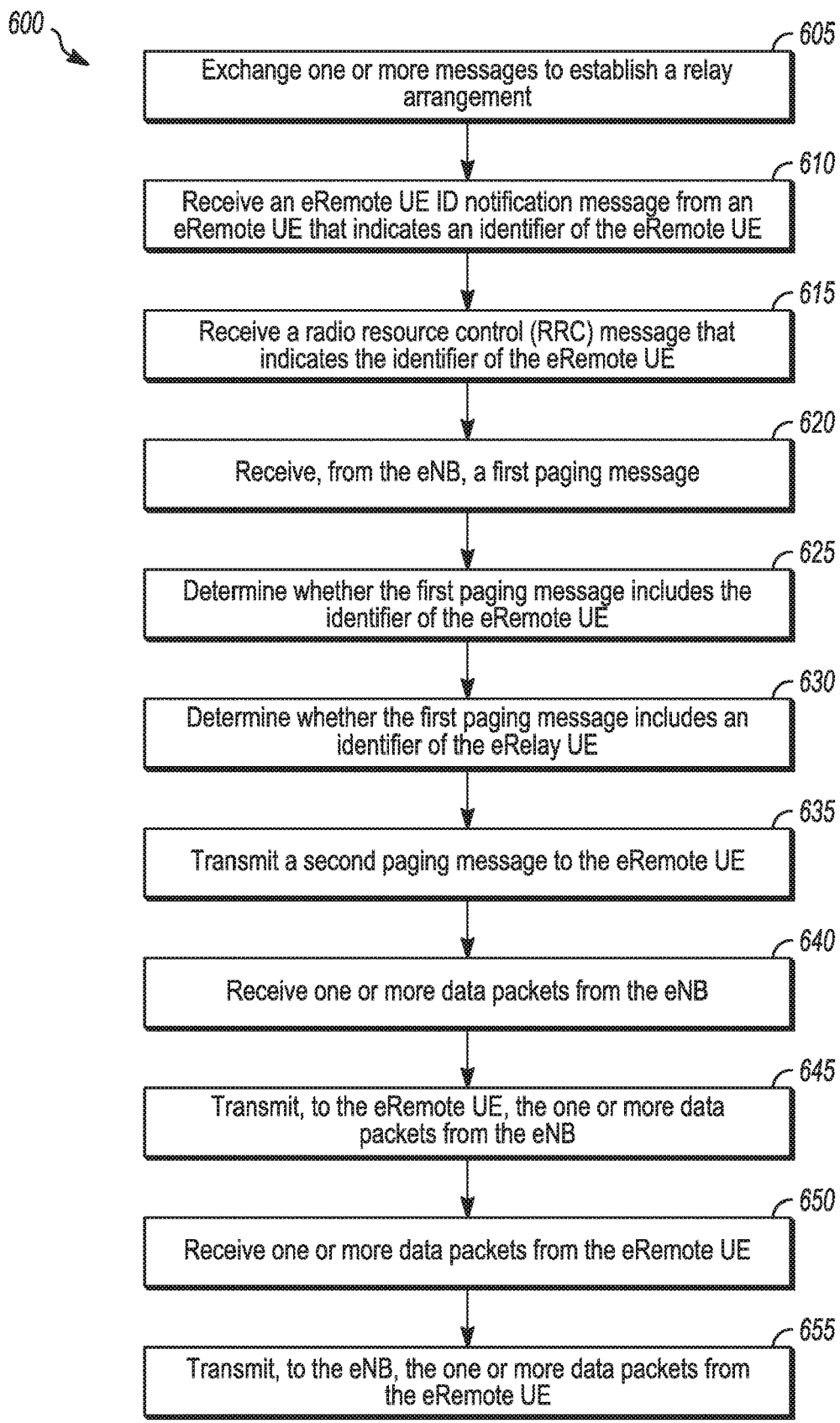
FIG. 6 illustrates the operation of a method of communication in accordance with some embodiments.
Figure 7:
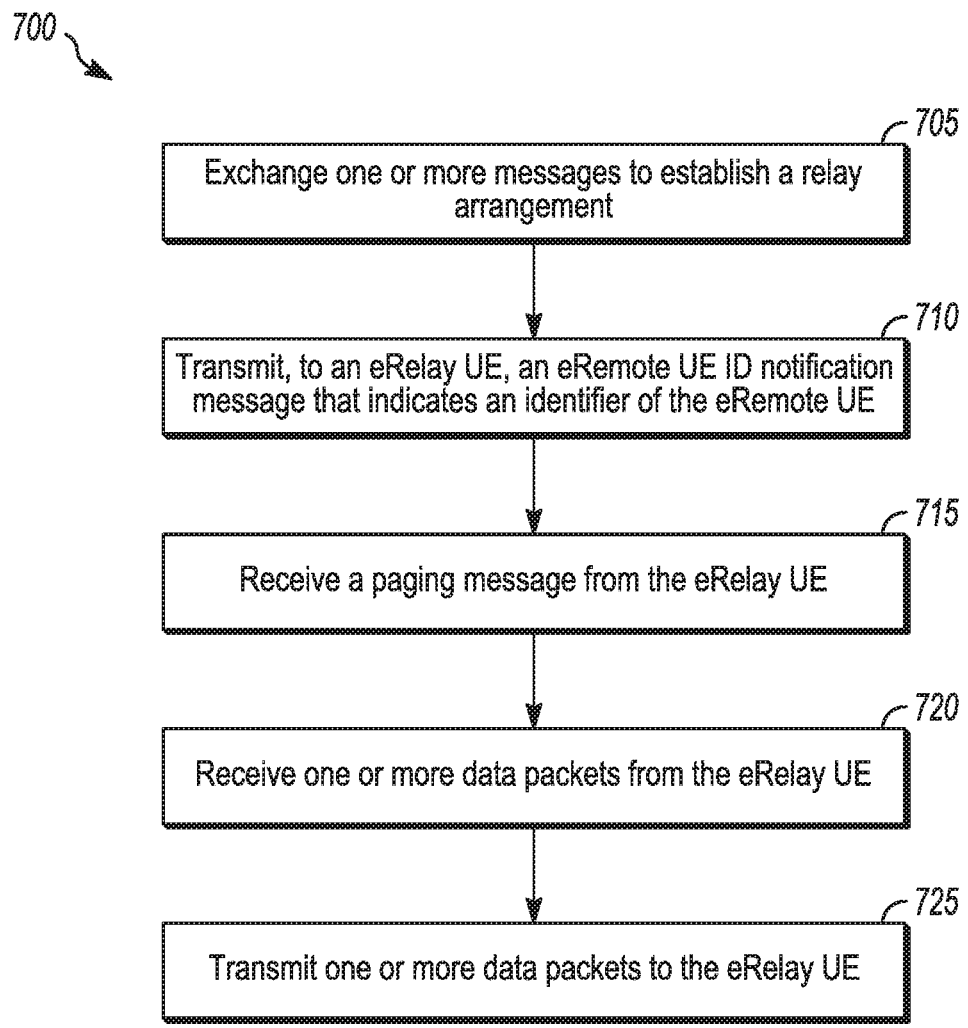
FIG. 7 illustrates the operation of another method of communication in accordance with some embodiments.
Figure 8:
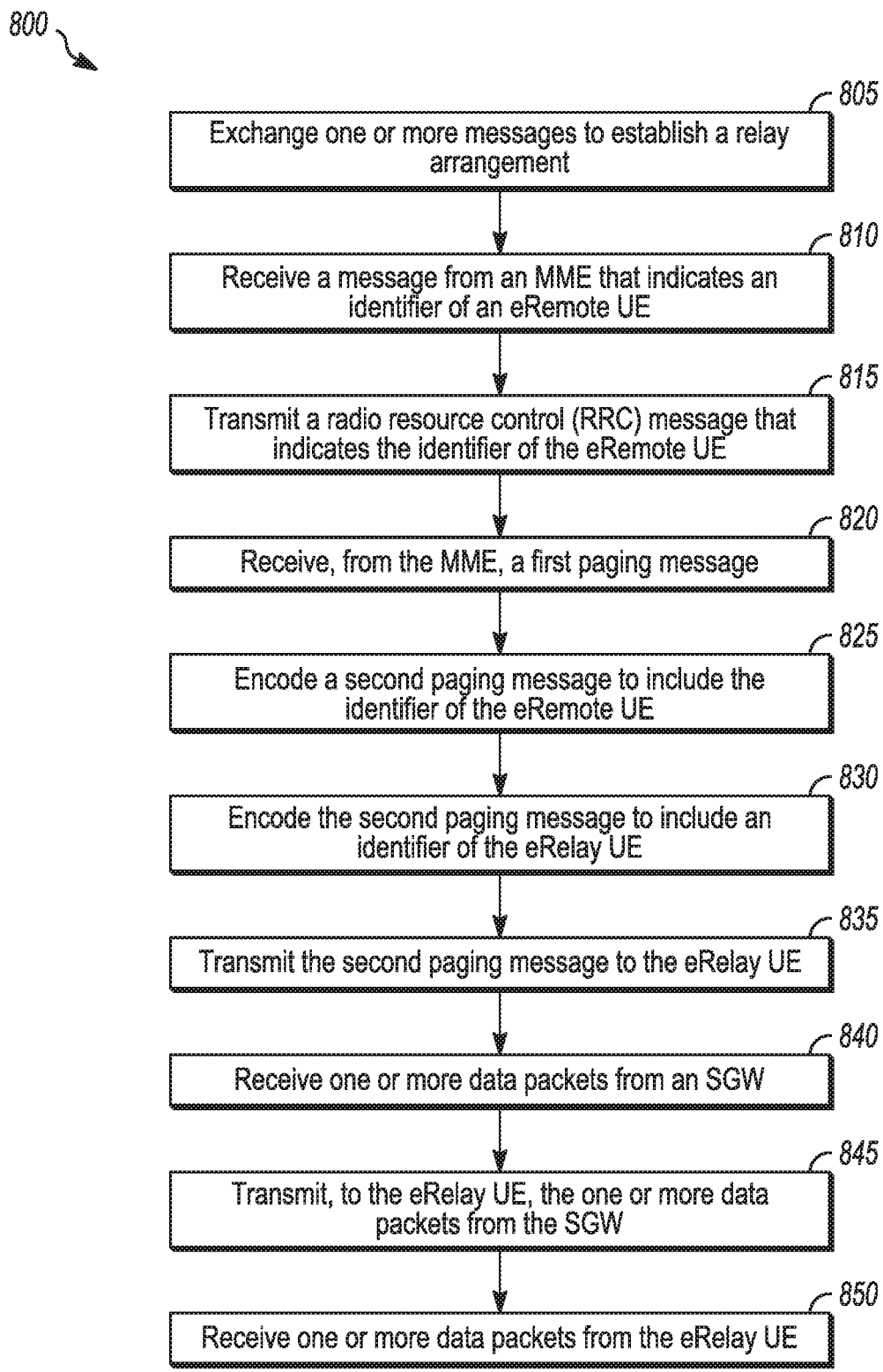
FIG. 8 illustrates the operation of another method of communication in accordance with some embodiments.

FIG. 6 illustrates the operation of a method of communication in accordance with some embodiments. FIG. 7 illustrates the operation of another method of communication in accordance with some embodiments. FIG. 8 illustrates the operation of another method of communication in accordance with some embodiments. It is important to note that embodiments of the methods 600, 700, 800 may include additional or even fewer operations or processes in comparison to what is illustrated in FIGS. 6-8. In addition, embodiments of the methods 600, 700, 800 are not necessarily limited to the chronological order that is shown in FIGS. 6-8. In describing the methods 600, 700, 800, reference may be made to one or more figures, although it is understood that the methods 600, 700, 800 may be practiced with any other suitable systems, interfaces and components.

In some embodiments, a UE 102 may perform one or more operations of the method 600, but embodiments are not limited to performance of the method 600 and/or operations of it by the UE 102. In some embodiments, another device and/or component may perform one or more operations of the method 600. In some embodiments, another device and/or component may perform one or more operations that may be similar to one or more operations of the method 600. In some embodiments, another device and/or component may perform one or more operations that may be reciprocal to one or more operations of the method 600. In some embodiments, a UE 102 may be configurable to operate as an eRelay UE, and may perform one or more operations of the method 600.

In some embodiments, a UE 102 may perform one or more operations of the method 700, but embodiments are not limited to performance of the method 700 and/or operations of it by the UE 102. In some embodiments, another device and/or component may perform one or more operations of the method 700. In some embodiments, another device and/or component may perform one or more operations that may be similar to one or more operations of the method 700). In some embodiments, another device and/or component may perform one or more operations that may be reciprocal to one or more operations of the method 700. In some embodiments, a UE 102 may be configurable to operate as an eRemote UE, and may perform one or more operations of the method 700.

In some embodiments, an eNB 104 may perform one or more operations of the method 800, but embodiments are not limited to performance of the method 800 and/or operations of it by the eNB 104. In some embodiments, another device and/or component may perform one or more operations of the method 800. In some embodiments, another device and/or component may perform one or more operations that may be similar to one or more operations of the method 800.

In some embodiments, another device and/or component may perform one or more operations that may be reciprocal to one or more operations of the method 800.

It should be noted that one or more operations of one of the methods 600, 700, 800 may be the same as, similar to and/or reciprocal to one or more operations of the other methods. For instance, an operation of the method 600 may be the same as, similar to and/or reciprocal to an operation of the method 700, in some embodiments. In a non-limiting example, an operation of the method 600 may include transmission of an element (such as a frame, block, message and/or other) by the eRelay UE 102 to the eRemote UE 102, and an operation of the method 700 may include reception of a same element (and/or similar element) by the eRemote UE 102 from the eRelay UE 102. In some cases, descriptions of operations and techniques described as part of one of the methods 600, 700, 800 may be relevant to one or both of the other methods.

Discussion of various techniques and concepts regarding one of the methods 600, 700). 800 and/or other method may be applicable to one of the other methods, although the scope of embodiments is not limited in this respect. Such technique and concepts may include eRemote UE, eRelay UE, various messages, parameters included in the messages, relay arrangements, paging operations and/or other.

In descriptions of the methods 600, 700, 800, references to an eRemote UE and/or eRelay UE may be used for clarity, but the scope of embodiments is not limited by those references. In some embodiments, a UE 102 may be configurable to operate as either an eRemote UE or as an eRelay UE, although the scope of embodiments is not limited in this respect.

The methods 600, 700, 800 and other methods described herein may refer to eNBs 104, gNBs 105 or UEs 102 operating in accordance with 3GPP standards, 5G standards, NR standards and/or other standards. However, embodiments of those methods are not limited to just those eNBs 104, gNBs 105 or UEs 102 and may also be practiced on other devices, such as a Wi-Fi access point (AP) or user station (STA). In addition, the methods 600, 700, 800 and other methods described herein may be practiced by wireless devices configured to operate in other suitable types of wireless communication systems, including systems configured to operate according to various IEEE standards such as IEEE 802.11. The methods 600, 700, 800 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 600, 700 and 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

Figure 9:
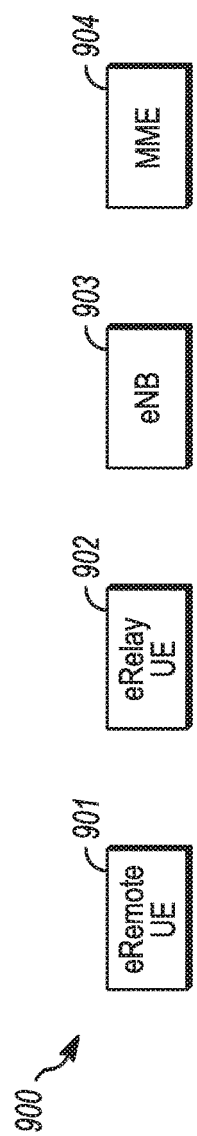
FIG. 9 illustrates example devices that may perform one or more operations in accordance with some embodiments.
Figure 10:
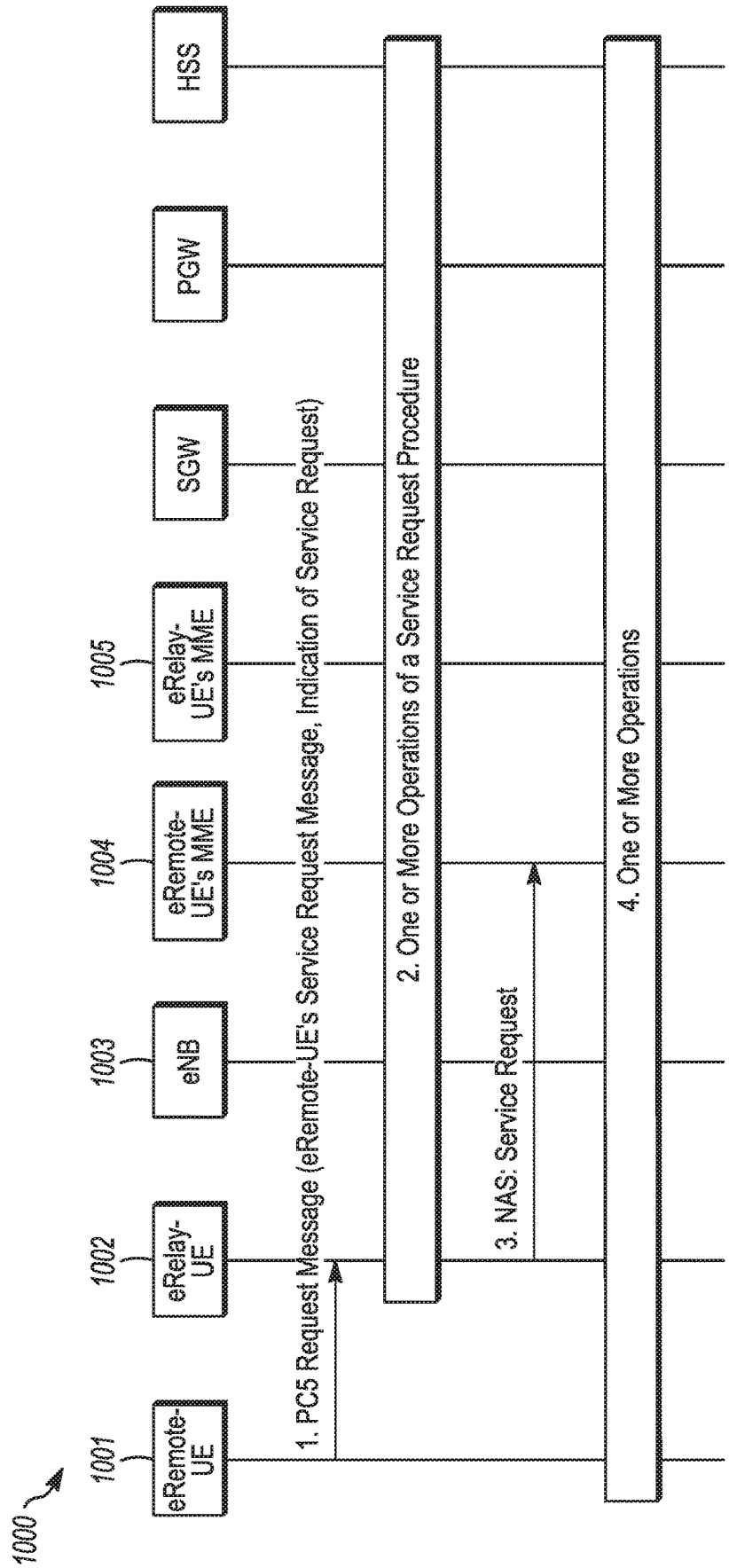
FIG. 10 illustrates example operations in accordance with some embodiments.
Figure 11:
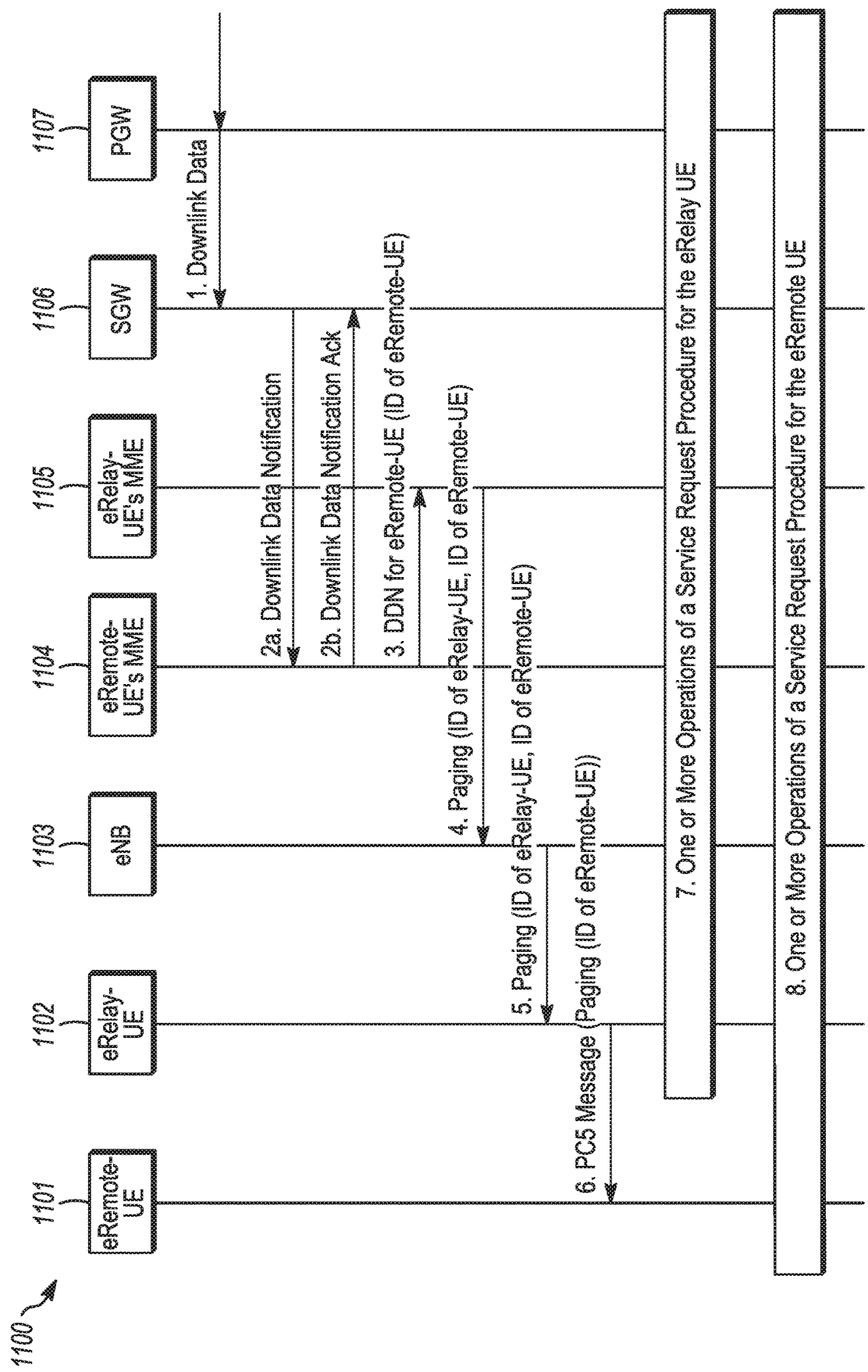
FIG. 11 illustrates example operations in accordance with some embodiments.
Figure 12:
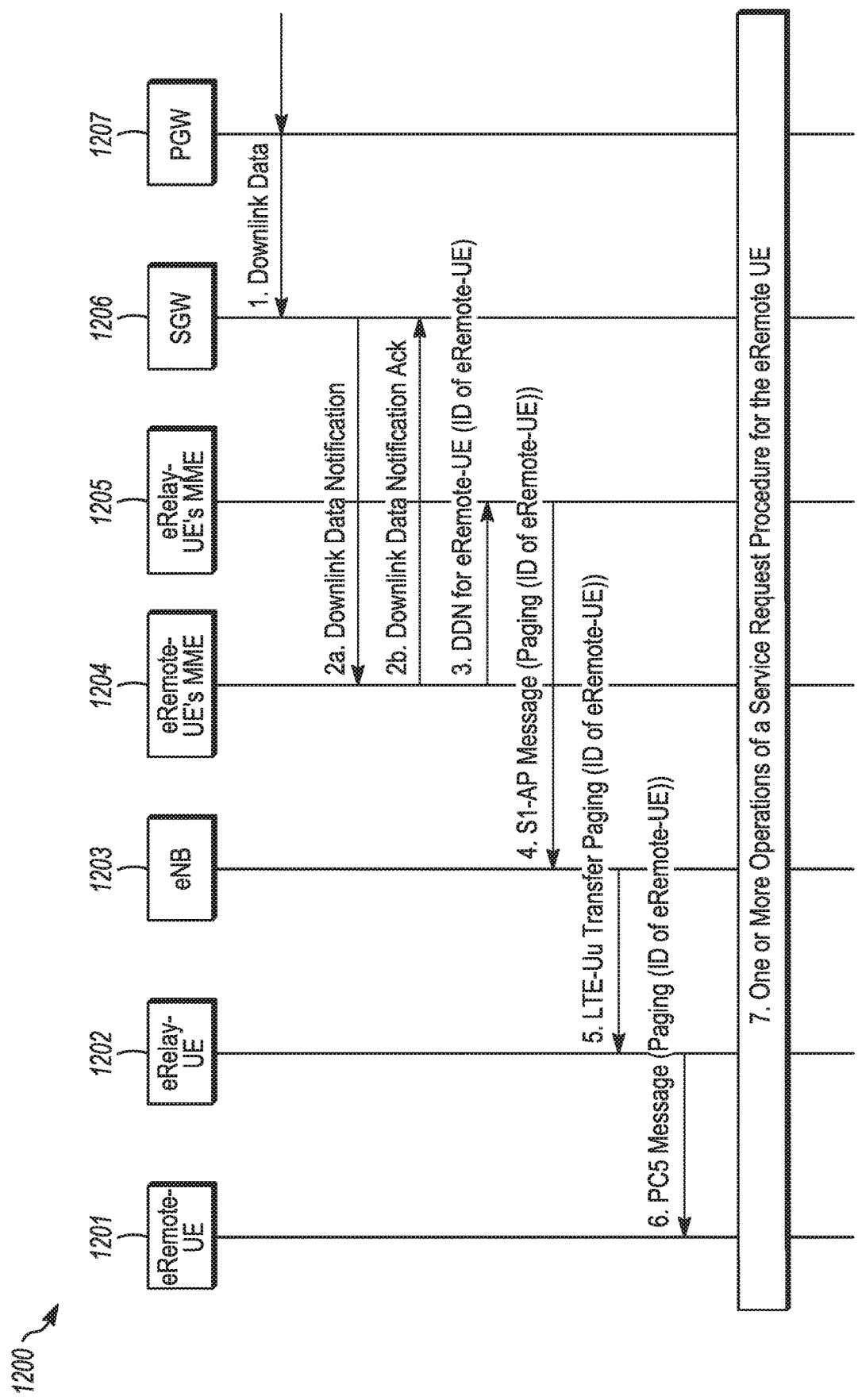
FIG. 12 illustrates example operations in accordance with some embodiments.
Figure 13:
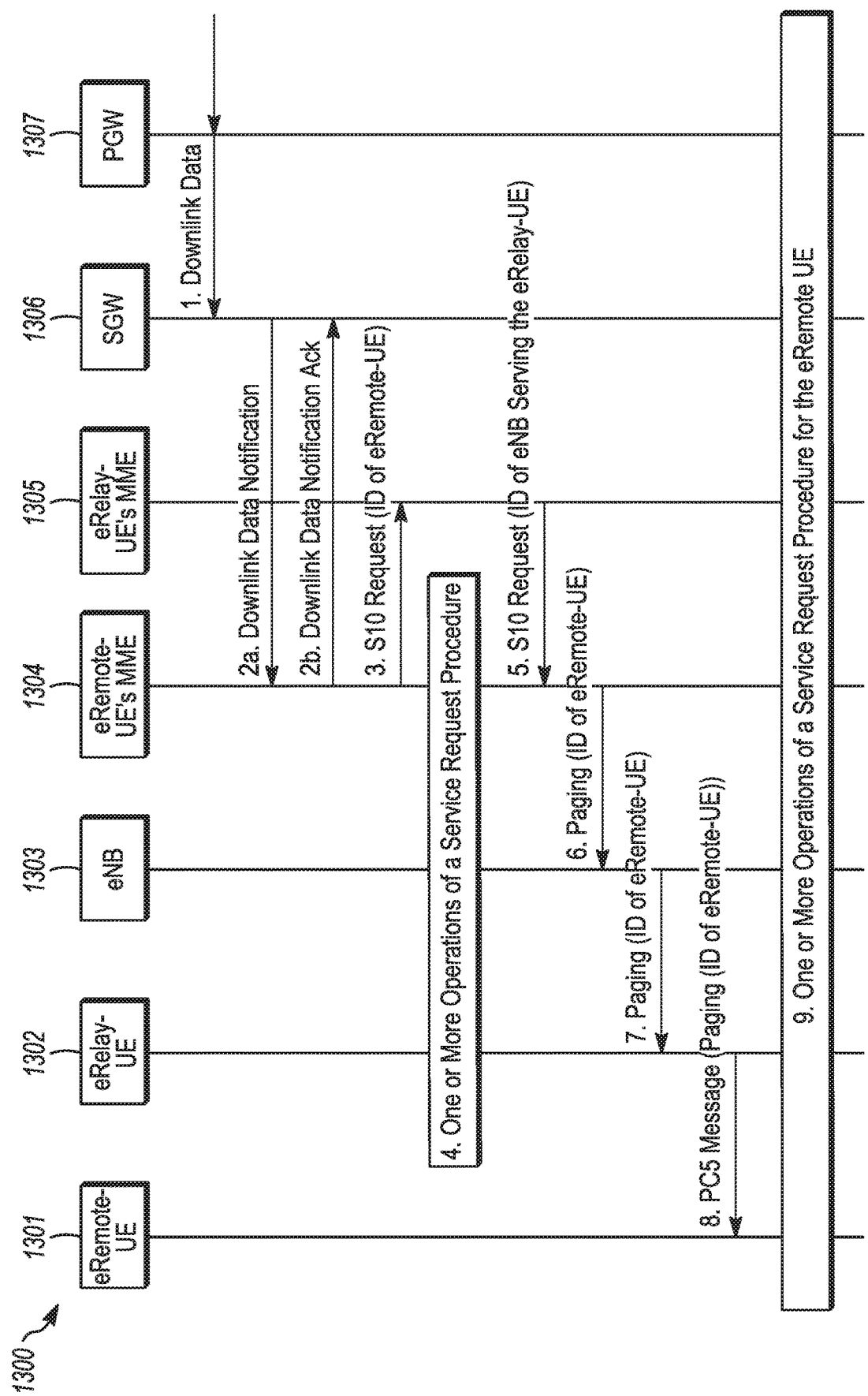
FIG. 13 illustrates example operations in accordance with some embodiments.
Figure 14:
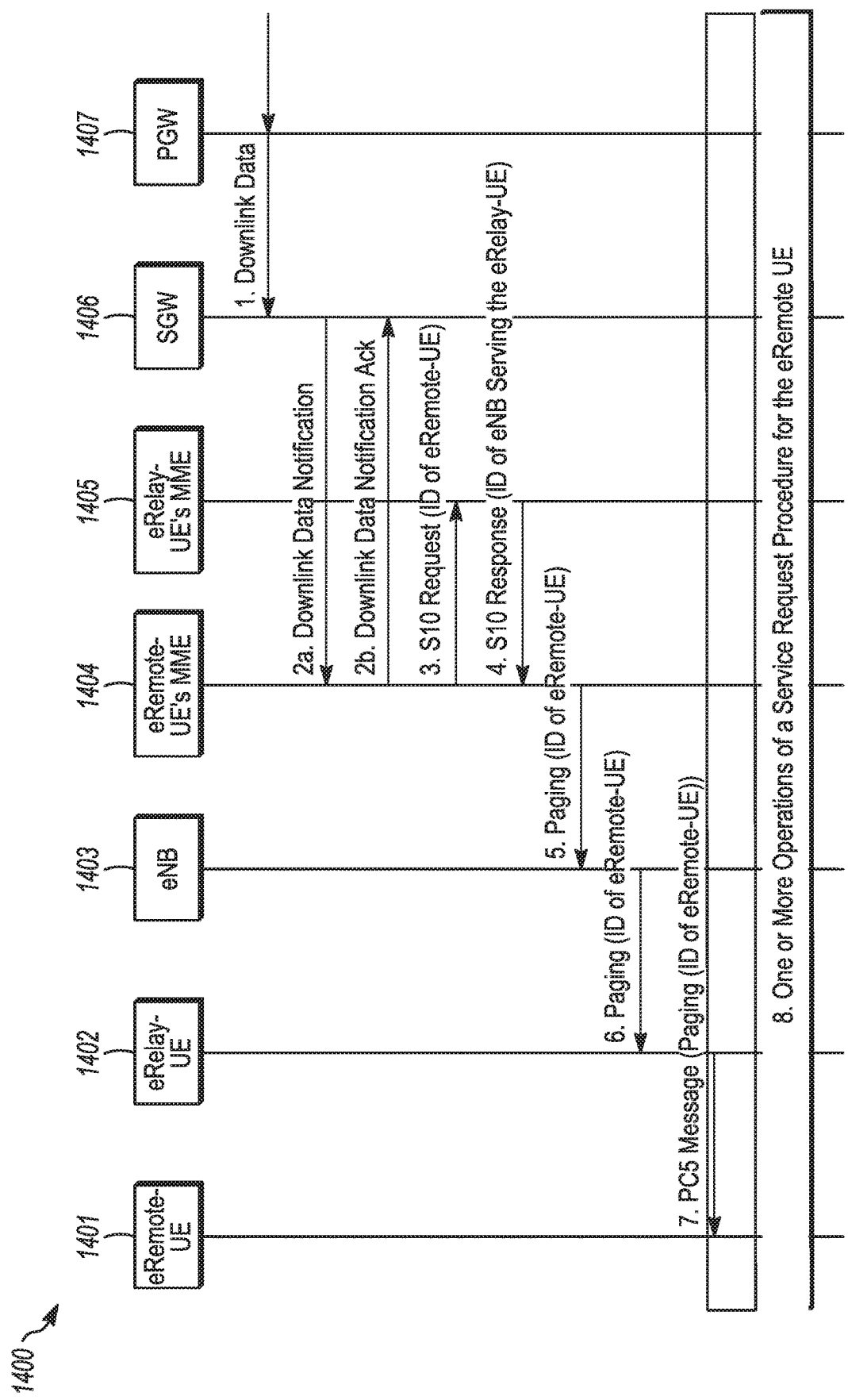
FIG. 14 illustrates example operations in accordance with some embodiments.
Figure 15:
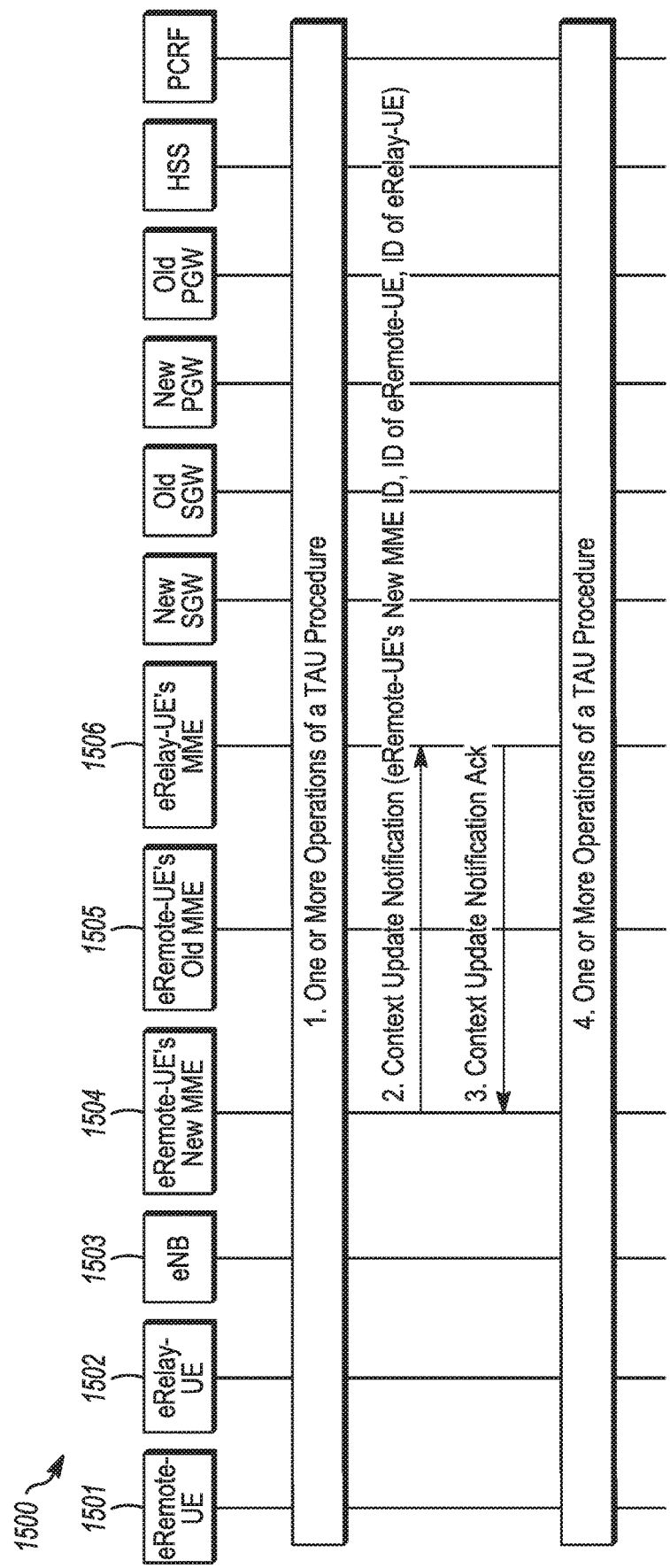
FIG. 15 illustrates example operations in accordance with some embodiments.
Figure 16:
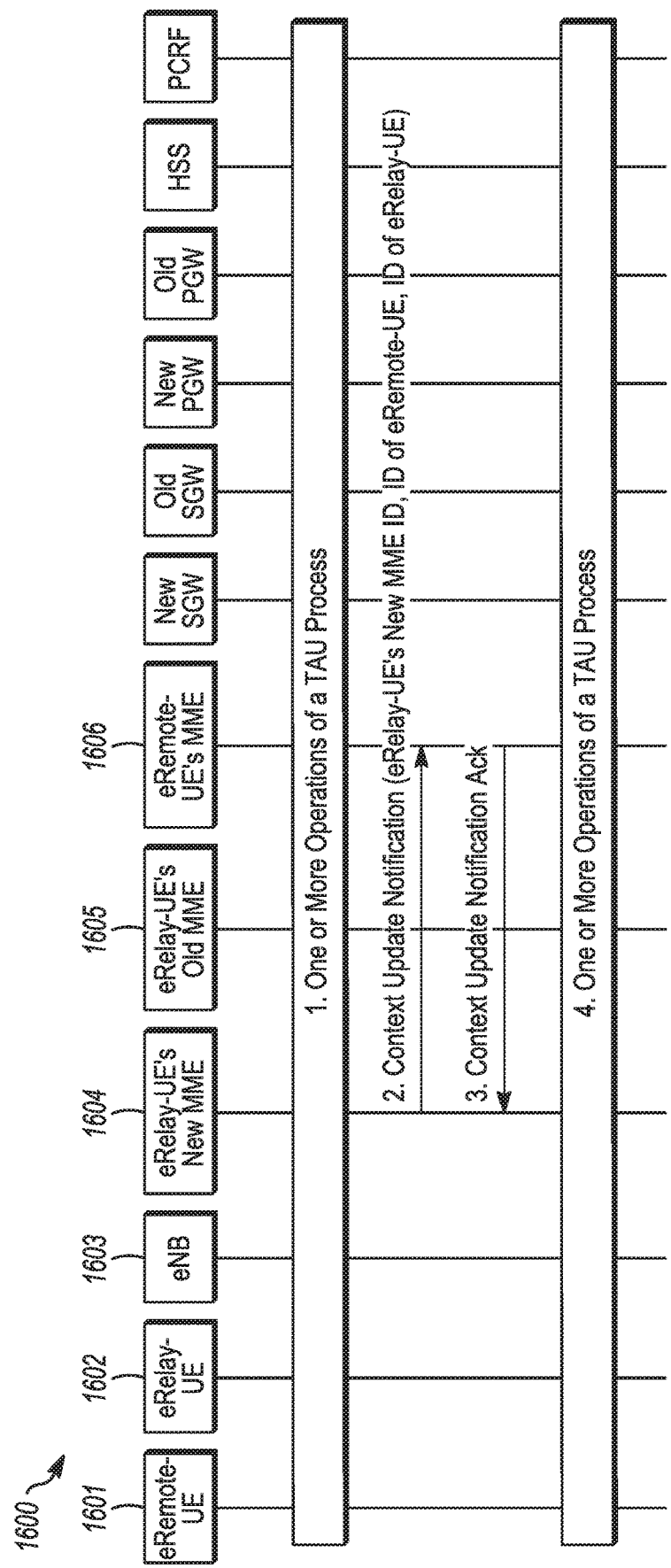
FIG. 16 illustrates example operations in accordance with some embodiments.

FIG. 9 illustrates example devices that may perform one or more operations in accordance with some embodiments. FIG. 10 illustrates example operations in accordance with some embodiments. FIG. 11 illustrates example operations in accordance with some embodiments. FIG. 12 illustrates example operations in accordance with some embodiments. FIG. 13 illustrates example operations in accordance with some embodiments. FIG. 14 illustrates example operations in accordance with some embodiments. FIG. 15 illustrates example operations in accordance with some embodiments. FIG. 16 illustrates example operations in accordance with some embodiments. It should be noted that the examples shown in FIGS. 9-16 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 9-16. Although some of the elements shown in the examples of FIGS. 9-16 may be included in a 3GPP LTE standard, 5G standard, NR standard and/or other standard, embodiments are not limited to usage of such elements that are included in standards.

The methods 600, 700, 800 may be described in terms of the devices (eRemote UE 901, eRelay UE 902, eNB 903, MME 904) shown in FIG. 9 for clarity, but it is understood that embodiments are not limited to performance of the operations of the methods 600, 700, 800 by those devices shown in FIG. 9. In some embodiments, one or more devices and/or components described herein may perform one or more of the operations of the methods 600, 700, 800 (and/or other methods). In some embodiments, one or more devices and/or components shown in the figures (including but not limited to FIG. 1A, FIB. 1B, and FIGS. 2-5) described herein may perform one or more of the operations of the methods 600, 700, 800 (and/or other methods).

At operation 605, the eRelay UE 902 may exchange one or more messages to establish a relay arrangement. The messages may include, but are not limited to service request messages and PC5 request messages. In a non-limiting example, the eRelay UE 902 may receive a PC5 request message from the eRemote UE 901. The service request message and/or PC5 request message may be included in a 3GPP standard, in some embodiments. It should be noted that embodiments are not limited to usage of the service request message and/or PC5 request message in this operation and in other operations described herein, as any suitable messages may be used.

In some embodiments, the eRelay UE 902 may be configured to communicate with the eRemote UE 901 and the eNB 903 in accordance with the relay arrangement. In some embodiments, the eRelay UE 902 may operate as a relay between the eRemote UE 901 and the eNB 903. In some embodiments, the relay arrangement may include a sidelink communication between the eRemote UE 901 and the eRelay UE 902. In some embodiments, the relay arrangement may include a direct communication between the eRemote UE 901 and the eRelay UE 902. In some embodiments, the relay arrangement may include communication (sidelink, direct and/or other) between the eRemote UE 901 and the eRelay UE 902 in accordance with a proximity service (ProSe) arrangement.

In some embodiments, the eRelay UE 902 may receive data packets from the eRemote UE 901 and may transmit and/or forward the data packets to the eNB 903 as part of the relay arrangement. In some embodiments, the eRelay UE 902 may receive data packets from the eNB 903 and may transmit and/or forward the data packets to the eRemote UE 901 as part of the relay arrangement.

In some embodiments, the eRelay UE 902 may transmit one or more messages to an eRemote UE 901 as part of an establishment of the relay arrangement. In some embodiments, the eRelay UE 902 may transmit one or more messages to the eNB 903 as part of the establishment of the relay arrangement. In some embodiments, the eRelay UE 902 may receive one or more messages from the eRemote UE 901 as part of the establishment of the relay arrangement. In some embodiments, the eRelay UE 902 may receive one or more messages from the eNB 903 as part of the establishment of the relay arrangement.

At operation 610, the eRelay UE 902 may receive an eRemote UE ID notification message from the eRemote UE 901. In some embodiments, the eRemote UE ID notification message may include an identifier of the eRemote UE 901. In some embodiments, the identifier of the eRemote UE 901 may be used for paging of the eRemote UE 901. In some embodiments, the eRemote UE ID notification message may be transmitted, by the eRemote UE 901, to indicate that the identifier of the eRemote UE 901 is to be used for paging of the eRemote UE 901. In some embodiments, the eRemote UE ID notification message may be transmitted, by the eRemote UE 901, to notify the eRelay UE 901 of the eRemote UE 901. The eRemote UE ID notification message may be included in a 3GPP standard, in some embodiments. It should be noted that embodiments are not limited to usage of the eRemote UE ID notification message in this operation and in other operations described herein, as any suitable messages may be used.

In a non-limiting example, the identifier of the eRemote UE 901 may be an international mobile subscriber identity (IMSI). In another non-limiting example, the identifier of the eRemote UE 901 may be a system architecture evolution temporary mobile subscriber identity (S-TMSI). In another non-limiting example, the identifier of the eRemote UE 901 may be a globally unique temporary identifier (GUTI). These examples are not limiting, as other suitable identifiers may be used, in some embodiments.

At operation 615, the eRelay UE 902 may receive a radio resource control (RRC) message from the eNB 903. In some embodiments, the RRC message may include the identifier of the eRemote UE 901. In some embodiments, the RRC message may be transmitted, by the eNB 903, to indicate that the identifier of the eRemote UE 901 is to be used for paging of the eRemote UE 901. In some embodiments, the RRC message may be transmitted, by the eNB 903, to notify the eRelay UE 902 of the identifier of the eRemote UE 901. The RRC message may be included in a 3GPP standard, in some embodiments. It should be noted that embodiments are not limited to usage of the RRC message in this operation and in other operations described herein, as any suitable messages may be used.

It should be noted that some embodiments of the method 600 may not necessarily include all operations shown in FIG. 6. For instance, some embodiments may include one, but not both, of operations 610-615. In those embodiments, the eRelay UE 902 may be informed of the identifier of the eRemote UE 901 by either the eRemote UE ID notification message or the RRC message.

At operation 620, the eRelay UE 902 may receive a first paging message. At operation 625, the eRelay UE may determine whether the first paging message includes the identifier of the eRemote UE 901. At operation 630, the eRelay UE 902 may determine whether the first paging message includes an identifier of the eRelay UE 902. It should be noted that operation 630 may not necessarily be performed in some cases. At operation 635, the eRelay UE 902 may transmit a second paging message to the eRemote UE 901. The paging messages referred to in operations 620-635 may be referred to in descriptions herein as a "first paging message" and a "second paging message" for clarity, but such references are not limiting.

In some embodiments, the eRelay UE 902 may determine, based at least partly on whether the first paging message includes the identifier of the eRemote UE 901, whether the eRemote UE 901 is to be paged. In some embodiments, the eRelay UE 902 may determine, based at least partly on whether the first paging message includes the identifier of the eRemote UE 901, whether the first paging message was transmitted by the eNB 903 to page the eRemote UE 901.

In some embodiments, the eRelay UE 902 may transmit the second paging message to the eRemote UE 901 to page the eRemote UE 901, although the scope of embodiments is not limited in this respect. In some embodiments, the eRelay UE 901 may transmit the second paging message to the eRemote UE 901 if it is determined that the first paging message includes the identifier of the eRemote UE 901. In some embodiments, the second paging message may include the identifier of the eRemote UE 901.

It should be noted that operation 630 may not necessarily be performed in some cases. In a non-limiting example, if the eRelay UE 902 is in a connected mode when the first paging message is received, the eRelay UE 902 may not necessarily determine whether the first paging message includes the identifier of the eRelay UE 902. For instance, if the eRelay UE 902 is in the connected mode when the first paging message is received, the eRelay UE 902 may determine whether to encode the first paging message for transmission to the eRemote UE 901 based on whether the first paging message includes the identifier of the eRemote UE 901.

In another non-limiting example, if the eRelay UE 902 is in an idle mode when the first paging message is received, the eRelay UE 902 may determine if the first paging message includes the identifier of the eRelay UE 901. If it is determined that the first paging message includes the identifier of the eRemote UE 901 and further includes the identifier of the eRelay UE 902, the eRelay UE 902 may transmit the second paging message to the eRemote UE 901. In some embodiments, if the eRelay UE 902 is in the idle mode when the first paging message is received, the first paging message may page the eRelay UE 902 and/or the eRemote UE 901.

At operation 640, the eRelay UE 902 may receive one or more data packets from the eNB 903. At operation 645, the eRelay UE 902 may transmit, to the eRemote UE 901, the one or more data packets from the eNB 903. In some embodiments, the first paging message may be transmitted, by the eNB 903, to page the eRemote UE 901 to indicate that the eRemote UE 901 is to receive the one or more data packets, although the scope of embodiments is not limited in this respect. In some embodiments, the eRelay UE 902 may transmit the one or more data packets to the eRemote UE 901 if it is determined that the first paging message includes the identifier of the eRemote UE 901, although the scope of embodiments is not limited in this respect.

At operation 650, the eRelay UE 902 may receive one or more data packets from the eRemote UE 901. At operation 655, the eRelay UE 902 may transmit, to the eNB 903, the one or more data packets from the eRemote UE 901.

One or more of the operations 640-655 may be performed in accordance with the relay arrangement, although the scope of embodiments is not limited in this respect. One or more of the operations 640 and 650 may be performed in accordance with the sidelink communication between the eRemote UE 901 and the eRemote UE 902, although the scope of embodiments is not limited in this respect. One or more of the operations 640 and 650 may be performed in accordance with a direct communication between the eRemote UE 901 and the eRemote UE 902, although the scope of embodiments is not limited in this respect.

In some embodiments, one or more of the operations of the method 600 may be extended to cases in which the eRelay UE 902 supports a plurality of relay arrangements with a plurality of eRemote UEs 901. For instance, the eRelay UE 902 may determine whether the first paging message includes identifiers of one or more of the eRemote UEs 901 of the plurality of eRemote UEs 901. The eRelay UE 902 may be configurable to transmit and/or forward multiple paging messages to multiple eRemote UEs 901. The eRelay UE 902 may be configurable to transmit and/or forward data packets to multiple eRemote UEs 901 in accordance with multiple relay arrangements.

In some embodiments, an apparatus of an eRelay UE 902 may comprise memory. The memory may be configurable to store the identifier of the eRemote UE 901. The memory may store one or more other elements and the apparatus may use them for performance of one or more operations. The apparatus may include processing circuitry, which may perform one or more operations (including but not limited to operation(s) of the method 600 and/or other methods described herein). The processing circuitry may include a baseband processor. The baseband circuitry and/or the processing circuitry may perform one or more operations described herein, including but not limited to determination of whether the first paging message includes the identifier of the eRemote UE 901. The apparatus may include a transceiver to receive one or more paging messages. The transceiver may transmit and/or receive other blocks, messages and/or other elements.

At operation 705, the eRemote UE 901 may exchange one or more messages to establish a relay arrangement. The messages may include, but are not limited to service request messages and PC5 request messages. In a non-limiting example, the eRemote UE 901 may transmit a PC5 request message to the eRelay UE 902. In some embodiments, the eRemote UE 901 may transmit one or more messages to the eRelay UE 902 as part of an establishment of the relay arrangement. In some embodiments, the eRemote UE 901 may receive one or more messages from the eRelay UE 902 as part of the establishment of the relay arrangement.

At operation 710, the eRemote UE 901 may transmit, to the eRelay UE 902, an eRemote UE ID notification message that indicates an identifier of the eRemote UE 901. At operation 715, the eRemote UE 901 may receive a paging message from the eRelay UE 902. The paging message may be the same as, or similar to, the second paging message described regarding operation 635, although the scope of embodiments is not limited in this respect.

At operation 720, the eRemote UE 901 may receive one or more data packets from the eRelay UE 902. At operation 725, the eRemote UE 901 may transmit one or more data packets to the eRelay UE 902. In some embodiments, one or more of operations 720-725 may be performed in accordance with the relay arrangement. In some embodiments, one or more of operations 720-725 may be performed in accordance with the sidelink communication between the eRemote UE 901 and the eRelay UE 902. In some embodiments, one or more of operations 720-725 may be performed in accordance with a direct communication between the eRemote UE 901 and the eRelay UE 902.

In some embodiments, the eRemote UE 901 may transmit a PC5 request message for an establishment of a relay arrangement in which the eRelay UE 902 is to operate as a relay between the eNB 903 and the eRemote UE 901. The eRemote UE 901 may transmit, to the eRelay UE 902, an eRemote UE ID notification message that includes an identifier of the eRemote UE 901 to be used to page the eRemote UE 901. The eRemote UE 901 may receive, from the eRelay UE 902, a paging message. The eRemote UE 901 may, if the paging message includes the identifier of the eRemote UE 901, decode a data packet from the eNB 903. The data packet may be received from the eRelay UE 902 in accordance with the relay arrangement.

In some embodiments, an apparatus of an eRemote UE 901 may comprise memory. The memory may be configurable to store the identifier of the eRemote UE 901. The memory may store one or more other elements and the apparatus may use them for performance of one or more operations. The apparatus may include processing circuitry, which may perform one or more operations (including but not limited to operation(s) of the method 700 and/or other methods described herein). The processing circuitry may include a baseband processor. The baseband circuitry and/or the processing circuitry may perform one or more operations described herein, including but not limited to decoding of one or more paging messages. The apparatus may include a transceiver to receive the one or more paging messages. The transceiver may transmit and/or receive other blocks, messages and/or other elements.

At operation 805, the eNB 903 may exchange one or more messages to establish a relay arrangement. In some embodiments, the eNB may be configured to communicate with the eRemote UE 901 through the eRelay UE 902 in accordance with the relay arrangement.

In some embodiments, the eNB 903 may transmit one or more messages to an eRemote UE 901 as part of an establishment of the relay arrangement. In some embodiments, the eNB 903 may transmit one or more messages to an eRelay UE 902 as part of an establishment of the relay arrangement. In some embodiments, the eNB 903 may transmit one or more messages to an MME 904 as part of an establishment of the relay arrangement. In some embodiments, the eNB 903 may receive one or more messages from an eRemote UE 901 as part of the establishment of the relay arrangement. In some embodiments, the eNB 903 may receive one or more messages from the eRelay UE 902 as part of the establishment of the relay arrangement. In some embodiments, the eNB 903 may receive one or more messages from the MME 904 as part of the establishment of the relay arrangement.

At operation 810, the eNB 903 may receive a message from the MME 904 that indicates an identifier of an eRemote UE 901. In some embodiments, the message may be included in a 3GPP standard, although the scope of embodiments is not limited in this respect.

In a non-limiting example, the identifier of the eRemote UE 901 may be an IMSI. In another non-limiting example, the identifier of the eRemote UE 901 may be an S-TMSI. In another non-limiting example, the identifier of the eRemote UE 901 may be a GUTI. These examples are not limiting, as other suitable identifiers may be used, in some embodiments.

At operation 815, the eNB 903 may transmit a radio resource control (RRC) message that indicates the identifier of the eRemote UE 901. In some embodiments, the identifier of the eRemote UE 901 may be used, by the eNB 903 and/or other component(s), to page the eRemote UE 901. The RRC message may be included in a 3GPP standard, in some embodiments. It should be noted that embodiments are not limited to usage of the RRC message in this operation and in other operations described herein, as any suitable messages may be used.

At operation 820, the eNB 903 may receive, from the MME 904, a first paging message. In some embodiments, the first paging message may indicate that the eRemote UE 901. In some embodiments, the first paging message may indicate that the eRemote UE 901 is to be paged for reception of one or more downlink data packets. In some embodiments, the first paging message may include the identifier of the eRemote UE 901.

In some embodiments, if the eRelay UE 902 operates in a connected mode, the first paging message may be included in an S1 application protocol (S1-AP) message received from the MME 904. The S1-AP message may be included in a 3GPP standard, in some embodiments. It should be noted that embodiments are not limited to usage of the S1-AP message in this operation and in other operations described herein, as any suitable messages may be used At operation 825, the eNB 903 may encode a second paging message to include the identifier of the eRemote UE 901. At operation 830, the eNB 903 may encode the second paging message to include an identifier of the eRelay UE 902. It should be noted that some embodiments of the method 800 may not necessarily include all operations shown in FIG. 8.

In a non-limiting example, operation 830 may be performed in some cases but may not necessarily be performed in other cases. For instance, the eNB 903 may encode the second paging message to include the identifier of the eRelay UE 902 if the eRelay UE 902 operates in an idle mode. But the eNB 903 may not necessarily include the identifier of the eRelay UE 902 if the eRelay UE 902 operates in a connected mode.

At operation 835, the eNB 903 may transmit the second paging message. In some embodiments, the eNB 903 may transmit the second paging message to the eRelay UE 902, although the scope of embodiments is not limited in this respect.

At operation 840, the eNB 903 may receive one or more data packets from an SGW 124. At operation 845, the eNB 903 may transmit, to the eRelay UE 902, the one or more data packets from the SGW 124. In some embodiments, the eNB 903 may forward, to the eRelay UE 902, the one or more data packets from the SGW 124. In some embodiments, the eNB 903 may transmit and/or forward the one or more data packets to the eRelay UE 902 to be forwarded to the eRemote UE 901.

In a non-limiting example, the eNB 903 may transmit the one or more data packets to the eRelay UE 902 in accordance with the relay arrangement. For instance, the eNB 903 may transmit the one or more data packets to the eRelay UE 902, and the eRelay UE 902 may transmit the one or more data packets to the eRemote UE 901. Accordingly, the eRelay UE 902 may operate as a relay in this example and in other scenarios.

At operation 850, the eNB 903 may receive one or more data packets from the eRelay UE 902. In a non-limiting example, the eNB 903 may receive the one or more data packets from the eRelay UE 902 in accordance with the relay arrangement. For instance, the eRemote UE 901 may transmit the one or more data packets to the eRelay UE 902, and the eRelay UE 902 may transmit the one or more data packets to the eNB 904. Accordingly, the eRelay UE 902 may operate as a relay in this example and in other scenarios.

It should be noted that one or more operations (including but not limited to the operations of the methods 600, 700, 800) may be extended to include multiple elements, such as relay arrangements, eRemote UEs 901, eRelay UEs 902, eNBs 903, MMEs 904 and/or other.

In a non-limiting example, the eNB 904 may be configurable to concurrently support a plurality of relay arrangements with the eRelay UE 902 and a plurality of eRemote UEs 901. In some embodiments, the eNB 904 may transmit multiple paging messages to the eRelay UE 902 to page two or more of the eRemote UEs 901 of the plurality of eRemote UEs 901. In some embodiments, the eNB 904 may transmit a paging message to the eRelay UE 902 to page two or more of the eRemote UEs 901 of the plurality of eRemote UEs 901

In another non-limiting example, the eNB 904 may be configurable to concurrently support a plurality of relay arrangements with the eRelay UE 902 and a plurality of eRemote UEs 901. For instance, the eRelay UE 902 may operate as a relay between the eNB 903 and a first eRemote UE 901 in a first relay arrangement. The eRelay UE 902 may operate as a relay between the eNB 903 and a second eRemote UE 901 in a second relay arrangement. This example may be extended to more than two relay arrangements and to more than two eRemote UEs 901.

In another non-limiting example, the eNB 903 may transmit multiple paging messages for multiple eRemote UEs 901 that communicate with the eNB 903 through relay arrangements that include the eRelay UE 902. Other operations described herein may be extended to include multiple elements.

In some embodiments, an apparatus of an eNB 903 may comprise memory. The memory may be configurable to store the identifier of the eRemote UE 901. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of the RRC message. The apparatus may include a transceiver to transmit the RRC message. The transceiver may transmit and/or receive other blocks, messages and/or other elements.

In some embodiments, the eNB 903 may reuse a current RRC paging message, and may not necessarily change one or more parameters of the message. The eRelay UE 902 may listen for, monitor for, decode, detect and/or attempt to detect an RRC paging message for the eRemote UE 901. To perform such operation(s), it may be necessary, in some cases, for the eRelay UE 902 to know an identifier of the eRemote UE 901. As an example, the identifier may be an international mobile subscriber identity (IMSI), a temporary mobile subscriber identity (TMSI) or a system architecture evolution (SAE) TMSI (S-TMSI), although embodiments are not limited to these example identifiers.

In some embodiments, after the eRemote UE 901 has established a communication path with the eRelay UE 902 and has been authorized to access the LTE network via the eRelay UE 902, the eRemote UE 901 or a network element may communicate an ID (such as an IMSI, S-TMSI and/or other) of the eRemote UE 901 to the eRelay UE 902. This operation may be performed for paging purposes, although the scope of embodiments is not limited in this respect.

In some embodiments, when the eRemote UE 901 has been authorized to access the LTE network via the eRelay UE 902, the eRemote UE 901 may communicate an ID (such as an IMSI, S-TMSI and/or other) of the eRemote UE 901 to the eRelay UE 902 in a message. For instance, an eRemote UE ID notification message may be used, although embodiments are not limited to this example message. The eRelay UE 902 may perform one or more of the following operations: store the ID of the eRemote UE 901; respond with a message, including but not limited to an eRemote UE ID notification acknowledgement message; listen for, monitor for, decode, detect and/or attempt to detect an RRC paging message for the eRemote UE 901 (which may include usage of the ID of the eRemote UE 901, in some embodiments); and/or other operation(s).

In some embodiments, when the eRemote UE 901 has been authorized to access the LTE network via eRelay UE 902, an MME 904 of the eRemote UE 901 may send the ID (such as an IMSI, S-TMSI and/or other) of the eRemote UE 901 to the eNB 903. The eNB 903 may send the ID of the eRemote UE 901 to the eRelay UE 902 in a message (including but not limited to an RRC message). The eRelay UE 902 may perform one or more of the following operations: store the ID of the eRemote UE 901; listen for, monitor for, decode, detect and/or attempt to detect an RRC paging message for the eRemote UE 901 (which may include usage of the ID of the eRemote UE 901, in some embodiments); and/or other operation(s).

In some embodiments, the eRemote UE 901 may use an indirect 3GPP communication (such as through the eRelay UE 902). In some cases, the eRemote UE 901 and the eRelay UE 902 may both be in an idle mode.

In some embodiments, when the eRemote UE 901 sends a service request message to the LTE network: in the PC5 message that conveys the service request message from the eRemote UE 901 to the eRelay UE 902, the indication of the service request message of the eRemote UE 901 may be included. Thus, if the eRelay UE 902 is in an idle mode, the eRelay UE 902 may need to send the service request message to the LTE network in order to establish the LTE-Uu and S1 connection and to further transfer the service request message for the eRemote UE 901.

In some embodiments, when there is a downlink data notification for the eRemote UE 901, the MME 904 of the eRemote UE 901 may: page the eRemote UE 901 through the MME 904 of the eRelay UE 902; or request an ID of the eNB 903 that serves the eRelay UE 902 and page the eRemote UE 901 via the eNB 903 that serves the eRelay UE 902.

In some embodiments, in order for the MME 904 of the eRemote-UE 901 to know the MME 904 of the eRelay-UE 902, the following may be performed. During an authorization procedure (such as an attach or a TAU to a new MME 904) for the eRemote UE 901 to access the LTE network via a layer 2 eRelay UE 902, the MME 904 of the eRemote UE 901 may include an ID of the MME 904 of the eRemote UE 901 in an authorization request message sent to the MME 904 of the eRelay UE 902. The MME 904 of the eRelay UE 902 may include an ID of the MME 904 of the eRelay UE 902 in an authorization response message sent to the MME 904 of the eRemote UE 901.

During a TAU procedure of the eRemote UE 901, a new MME 904 of the eRemote UE 901 may notify the MME 904 of the eRelay UE 902 about a change of MME 904 (such as to the new MME 904) and/or ID of the new MME 904 of the eRemote UE 901.

An example service request procedure is shown in FIG. 10. Some embodiments may not necessarily include all operations shown in FIG. 10. Some embodiments may include one or more operations not shown in FIG. 10. It should be noted that embodiments are not limited to the type of messages shown in FIG. 10, the names of messages shown in FIG. 10 or the ordering of messages shown in FIG. 10. One or more of the messages shown in FIG. 10 may be included in a 3GPP standard, although the scope of embodiments is not limited to usage of those messages. Embodiments are also not limited to messages that are included in a standard.

As indicated by "1" in FIG. 10, the eRemote UE 1001 may send a PC5 Request message. The message may include a NAS Service Request message of the eRemote UE 1001, an indication of the NAS Service Request message and/or other information. As indicated by "2" in FIG. 10, if the eRelay UE 1002 is in an idle mode, it may trigger a Service Request procedure. One or more of the operations of the service request procedure may be similar to operations included in a 3GPP standard, although the scope of embodiments is not limited in this respect. As indicated by "3" in FIG. 10, once the eRelay UE 1002 successfully establishes a connection with the LTE network, it may further forward the service request message of the eRemote UE 1001 to the LTE network. As indicated by "4" in FIG. 10, one or more operations may be performed. One or more of those operations may be similar to operations included in a 3GPP standard, although the scope of embodiments is not limited in this respect.

An example of paging through a procedure of the MME 1105 of the eRelay UE 1102 when the eRelay UE 1102 is in an idle mode is shown in FIG. 11. Some embodiments may not necessarily include all operations shown in FIG. 11. Some embodiments may include one or more operations not shown in FIG. 11. It should be noted that embodiments are not limited to the type of messages shown in FIG. 11, the names of messages shown in FIG. 11 or the ordering of messages shown in FIG. 11. One or more of the messages shown in FIG. 11 may be included in a 3GPP standard, although the scope of embodiments is not limited to usage of those messages. Embodiments are also not limited to messages that are included in a standard.

As indicated by "1" in FIG. 11, downlink data may arrive at the SGW 1106 that serves the eRemote UE 1101. As indicated by "2" in FIG. 11, the SGW 1106 may send a downlink data notification message to the MME 1104 of the eRemote UE 1101. The MME 1104 of the eRemote UE 1101 may acknowledge with a downlink data notification acknowledgement message. As indicated by "3" in FIG. 11, the MME 1104 of the eRemote UE 1101 may send the downlink data notification message to the MME 1105 of the eRelay UE 1102. The message may include an ID (such as a GUTI, IMSI, S-TMSI and/or other) of the eRemote UE 1101 and/or an ID (such as a GUTI, IMSI, S-TMSI and/or other) of the eRelay UE 1102.

As indicated by "4" in FIG. 11, if the eRelay UE 1102 is also in an idle mode, the MME 1105 of the eRelay UE 1102 may send a paging message to one or more eNBs (including eNB 1103) of a TAI list to page the eRelay 1102. The ID (such as the S-TMSI, IMSI, GUTI and/or other) of the eRemote UE 1101 may also be included in this paging message.

As indicated by "5" in FIG. 11, the eNB 1103 may forward the Paging message to the eRelay UE 1102. The eRelay UE 102 may use the ID (S-TMSI, IMSI and/or other) of the eRemote UE 1101 in order to decode and/or understand the Paging message. In some embodiments, the eRelay UE 102 may also use the ID (S-TMSI, IMSI and/or other) of the eRelay UE 1102 in order to decode and/or understand the Paging message. As indicated by "6" in FIG. 11, the eRelay UE 1102 may construct a Paging message that includes the ID of the eRemote UE 1101, and may send the paging message to the eRemote UE 1101 in a PC5 message.

As indicated by "7" in FIG. 11, one or more operations of a UE triggered Service Request procedure for the eRelay UE 1102 may be performed. One or more of the operations of the service request procedure may be similar to operations included in a 3GPP standard, although the scope of embodiments is not limited in this respect.

As indicated by "7" in FIG. 11, one or more operations of a UE triggered Service Request procedure for the eRemote UE 1101 may be performed. One or more of the operations of the service request procedure may be similar to operations included in a 3GPP standard, although the scope of embodiments is not limited in this respect.

An example of paging through a procedure of the MME 1205 of the eRelay UE 1202 when the eRelay UE 1202 is in a connected mode is shown in FIG. 12. Some embodiments may not necessarily include all operations shown in FIG. 12. Some embodiments may include one or more operations not shown in FIG. 12. It should be noted that embodiments are not limited to the type of messages shown in FIG. 12, the names of messages shown in FIG. 12 or the ordering of messages shown in FIG. 12. One or more of the messages shown in FIG. 12 may be included in a 3GPP standard, although the scope of embodiments is not limited to usage of those messages. Embodiments are also not limited to messages that are included in a standard.

As indicated by "1" in FIG. 12, downlink data may arrive at the SGW 1206 that serves the eRemote UE 1201. As indicated by "2" in FIG. 12, the SGW 1206 may send a downlink data notification message to the MME 1204 of the eRemote UE 1201. The MME 1204 of the eRemote UE 1201 may acknowledge with a downlink data notification acknowledgement message. As indicated by "3" in FIG. 12, the MME 1204 of the eRemote UE 1201 may send the downlink data notification message to the MME 1205 of the eRelay UE 1202. The message may include one or more of: the ID (S-TMSI, IMSI, GUTI and/or other) of the eRemote UE 1201 and/or the ID (S-TMSI, IMSI, GUTI and/or other) of the eRelay UE 1202.

As indicated by "4" in FIG. 12, if the eRelay UE 1202 is in the connected mode, the MME 1205 of the eRelay UE 1202 may generate a NAS Paging message for the eRemote UE 1201 and may send the message to the eNB 1203 that serves the eRelay UE 1202 in an S1-AP message. The ID (i.e. S-TMSI, IMSI) of the eRemote-UE is included in this paging message. As indicated by "5" in FIG. 12, the eNB 1203 may forward the paging message for the eRemote UE 1201 to the eRelay UE 1202 over an LTE-Uu interface. As indicated by "6" in FIG. 12, the eRelay UE 1202 may forward the paging message for the eRemote UE 1201 to the eRemote UE 1201 in a PC5 message.

As indicated by "7" in FIG. 12, one or more operations of a Service Request procedure for the eRemote UE 1201 may be performed. One or more of the operations of the service request procedure may be similar to operations included in a 3GPP standard, although the scope of embodiments is not limited in this respect.

An example of paging when the eRelay UE 1302 is in an idle mode is shown in FIG. 13. Some embodiments may not necessarily include all operations shown in FIG. 13. Some embodiments may include one or more operations not shown in FIG. 13. It should be noted that embodiments are not limited to the type of messages shown in FIG. 13, the names of messages shown in FIG. 13 or the ordering of messages shown in FIG. 13. One or more of the messages shown in FIG. 13 may be included in a 3GPP standard, although the scope of embodiments is not limited to usage of those messages. Embodiments are also not limited to messages that are included in a standard.

As indicated by "1" in FIG. 13, downlink data may arrive at the SGW 1306 that serves the eRemote UE 1301. As indicated by "2" in FIG. 13, the SGW 1306 may send a downlink data notification message to the MME 1304 of the eRemote UE 1301. The MME 1304 of the eRemote UE 1301 may acknowledge with a downlink data notification acknowledgement message.

As indicated by "3" in FIG. 13, the MME 1304 of the eRemote UE 1301 may send an S10 Request message to the MME 1305 of the eRelay Ue 1302. The message may include an ID (S-TMSI, IMSI, GUTI and/or other) of the eRemote UE 1301 and/or an ID (S-TMSI. IMSI, GUTI and/or other) of the eRelay UE 1302.

As indicated by "4" in FIG. 13, if the eRelay UE 1302 is in an idle mode, the MME 1305 of the eRelay UE 1302 may page the eRelay UE 1302 in accordance with one or more operations of a service request procedure. One or more of the operations of the service request procedure may be similar to operations included in a 3GPP standard, although the scope of embodiments is not limited in this respect.

As indicated by "5" in FIG. 13, once the eRelay UE 1302 is in a connected mode, the MME 1305 of the eRelay UE 1301 may respond with a S10 Response message to the MME 1304 of the eRemote UE 1302. The response message may include an ID of the eNB 1303 that serves the eRelay UE 1302.

As indicated by "6" in FIG. 13, the MME 1304 of the eRemote UE 1301 may send an S1-AP message encapsulating the NAS Paging message to the eNB 1303. As indicated by "7" in FIG. 13, the eNB 1303 may forward the NAS paging message to the eRelay UE 1302. As indicated by "8" in FIG. 13, the eRelay UE 1302 may forward the NAS Paging message to the eRemote UE 1301 in a PC5 message.

As indicated by "9" in FIG. 13, one or more operations of a service request procedure for the eRemote UE 1301 may be performed. One or more of the operations of the service request procedure may be similar to operations included in a 3GPP standard, although the scope of embodiments is not limited in this respect.

An example of paging when the eRelay UE 1402 is in a connected mode is shown in FIG. 14. Some embodiments may not necessarily include all operations shown in FIG. 14. Some embodiments may include one or more operations not shown in FIG. 14. It should be noted that embodiments are not limited to the type of messages shown in FIG. 14, the names of messages shown in FIG. 14 or the ordering of messages shown in FIG. 14. One or more of the messages shown in FIG. 14 may be included in a 3GPP standard, although the scope of embodiments is not limited to usage of those messages. Embodiments are also not limited to messages that are included in a standard.

As indicated by "1" in FIG. 14, downlink data may arrive at the SGW 1406 that serves the eRemote UE 1401. As indicated by "2" in FIG. 14, the SGW 1406 may send a downlink data notification message to the MME 1404 of the eRemote UE 1401. The MME 1404 of the eRemote UE 1401 may acknowledge with a downlink data notification acknowledgement message. As indicated by "3" in FIG. 14, the MME 1404 of the eRemote UE 1401 may send the S10 Request message to the MME 1405 of the eRelay UE 1402. The message may include an ID (S-TMSI, IMSI, GUTI and/or other) of the eRemote UE 1401 and/or an ID (S-TMSI, IMSI, GUTI and/or other) of the eRelay UE 1402. As indicated by "4" in FIG. 14, if the eRelay UE 1401 is in a connected mode, the MME 1405 of the eRelay UE 1401 may respond with an S10 response message to the MME 1404 of the eRemote UE 1401. The message may include an ID of the eNB 1403 that serves the eRelay UE 1401.

As indicted by "5" in FIG. 14, the MME 1404 of the eRemote UE 1401 may send an S1-AP message encapsulating the normal NAS Paging message to the eNB 1403. As indicated by "6" in FIG. 14, the eNB 1403 may forward the NAS Paging message to the eRelay UE 1402. As indicated by "7" in FIG. 14, the eRelay UE 1402 may forward the NAS Paging message to the eRemote UE 1401 in a PC5 message. As indicated by "8" in FIG. 14, one or more operations of a service request procedure for the eRemote UE 1401 may be performed. One or more of the operations of the service request procedure may be similar to operations included in a 3GPP standard, although the scope of embodiments is not limited in this respect.

In some embodiments, an eRelay UE 902 and/or eRemote UE 901 may store an ID of an MME 904. The eRelay UE 902 and/or eRemote UE 901 may use the ID during an authorization of eRemote UE 901 accessing the network via layer-2 eRelay UE 902. During a procedure of authorization (such as attach, TAU and/or other) for eRemote-UE 901 accessing via a layer 2 relay, the MME 904 of the eRemote UE 901 may check with the MME 904 of the eRelay UE 902 about the authorization. The MME 904 of the eRemote UE 901 may include the ID of the MME 904 of the eRemote UE 901 in an authorization request message. The MME of the eRelay UE 902 may store the ID of the MME 904 of the eRemote-UE 901 in an MM context of the eRelay UE 902. The MME 904 of the eRelay UE 902 may include the ID of the MME 904 of the eRelay UE 902 in an authorization response message. The MME 904 of the eRemote UE 902 may store the ID of the MME 904 of the eRelay UE 902 in an MM context of the eRemote UE 901.

In some embodiments, if the MME ID of the eRemote UE 901 and/or eRelay UE 902 are not explicitly included in the authorization request message and/or authorization response message, a receiving MME 904 may derive one or more of those MME IDs based at least partly on a source IP address of a received message.

An example of mutual updating of an MME ID during a normal TAU procedure is shown in FIG. 15. Some embodiments may not necessarily include all operations shown in FIG. 15. Some embodiments may include one or more operations not shown in FIG. 15. It should be noted that embodiments are not limited to the type of messages shown in FIG. 15, the names of messages shown in FIG. 15 or the ordering of messages shown in FIG. 15. One or more of the messages shown in FIG. 15 may be included in a 3GPP standard, although the scope of embodiments is not limited to usage of those messages. Embodiments are also not limited to messages that are included in a standard.

As indicated by "1" in FIG. 15, one or more operations of a TAU procedure may be performed. One or more of the operations of the TAU procedure may be similar to operations included in a 3GPP standard, although the scope of embodiments is not limited in this respect.

As indicated by "2" in FIG. 15, the MME 1505 of the eRemote UE 1501 may send a context update notification message to the MME 1506 of the eRelay UE 1502. The message may include one or more of: an MME ID of the new MME 1504, an ID (S-TMSI. IMSI, GUTI and/or other) of the eRemote UE 1501 and/or an ID (S-TMSI, IMSI, GUTI and/or other) of the eRelay UE 1502.

As indicated by "3" in FIG. 14, the MME 1506 of the eRelay UE 1502 may store the MME ID of the new MME 1504 of the eRemote UE 1501 and/or new GUTI in the MM context of the eRelay UE 1502. The MME 1506 of the eRelay UE 1502 may response with a context update notification acknowledgement message to the MME 1504 of the eRemote UE 1501. As indicated by "4" in FIG. 15, one or more operations of a TAU procedure may be performed. One or more of the operations of the TAU procedure may be similar to operations included in a 3GPP standard, although the scope of embodiments is not limited in this respect.

An example of a TAU procedure is shown in FIG. 16. Some embodiments may not necessarily include all operations shown in FIG. 16. Some embodiments may include one or more operations not shown in FIG. 16. It should be noted that embodiments are not limited to the type of messages shown in FIG. 16, the names of messages shown in FIG. 16 or the ordering of messages shown in FIG. 16. One or more of the messages shown in FIG. 16 may be included in a 3GPP standard, although the scope of embodiments is not limited to usage of those messages. Embodiments are also not limited to messages that are included in a standard.

As indicated by "1" in FIG. 16, one or more operations of a TAU procedure may be performed. One or more of the operations of the TAU procedure may be similar to operations included in a 3GPP standard, although the scope of embodiments is not limited in this respect.

As indicated by "2" in FIG. 16, the MME 1604 of the eRelay UE 1602 may send a context update notification message to the MME 1606 of the eRemote UE 1601. The message may include an MME ID of the new MME 1604 of the eRemote UE 1601, an ID (S-TMSI, IMSI, GUTI and/or other) of the eRemote UE 1601 and/or an ID (S-TMSI, IMSI, GUTI and/or other) of the eRelay UE 1602.

As indicated by "3" in FIG. 16, the MME 1606 of the eRemote UE 1601 may store the MME ID of the new MME 1604 of the eRelay UE 1602 and/or a new GUTI in an MM context of the eRemote UE 1601. The MME 1606 of the eRemote UE 1601 may respond with a context update notification acknowledgement message to the MME 1604 of the eRelay UE 1601.

As indicated by "4" in FIG. 16, one or more operations of a TAU procedure may be performed. One or more of the operations of the TAU procedure may be similar to operations included in a 3GPP standard, although the scope of embodiments is not limited in this respect.

In some embodiments, if the MME ID(s) of the eRemote UE 1601 and/or eRelay UE 1602 are not explicitly included in the context request message, a receiving MME may derive an MME ID based at least partly on a source IP address of a received message.

In some embodiments, the eRemote UE 901 may send a PC5 Request message to the eRelay UE 902. The eRemote UE 901 may include an indication of a service request message. When receiving the indication of the Service Request message, the eRelay UE 902, while in an idle mode, may trigger the Service Request procedure.

In some embodiments, when the eRemote UE 901 is to be paged through the MME 904 of the eRelay UE 902, when the MME 904 of the eRemote UE 901 receives the downlink data notification message, it may send a downlink data notification message to the MME 904 of the eRelay UE 902, the message may include an ID (S-TMSI, IMSI, GUTI and/or other) of the eRemote UE 901 and/or an ID (S-TMSI, IMSI, GUTI and/or other) of the eRelay UE 902. In some embodiments, if the eRelay UE 901 is in an idle mode, the MME 904 of the eRelay UE 902 may page one or more eNBs 903 in the Tracking Area of the eRelay UE 902. A paging message for this purpose may include an ID (S-TMSI, IMSI. GUTI and/or other) of the eRemote UE 901 and/or an ID (S-TMSI. IMSI, GUTI and/or other) of the eRelay UE 902. In some embodiments, the eNB 903 may receive the paging message and may forward it to the eRelay UE 902. In some embodiments, the eRelay UE 902 may identify the ID (S-TMSI, IMSI. GUTI and/or other) of the eRemote UE 901 in the Paging message. The eRelay UE 902 may construct a paging message for the eRemote UE 901 that includes the ID of the eRemote UE 901. The eRelay UE 902 may send the paging message to the eRemote UE 901 in a PC5 message.

In some cases, (including but not limited to cases in which the eRemote UE 901 is not paged through the MME 904 of the eRelay UE 902) when the MME 904 of the eRemote UE 901 receives a downlink data notification message, it may send an S10 request message to the MME 904 of the eRelay UE 902. The S10 request message may include an ID (such as an S-TMSI, IMSI, GUTI and/or other) of the eRemote UE 901 and/or an ID (such as an S-TMSI, IMSI, GUTI and/or other) of the eRelay UE 902. In some embodiments, when the eRelay UE 902 is in a connected mode, the MME 904 of the eRelay UE 902 may send an S10 response message to the MME 904 of the eRemote UE 901. The S10 response message may include an ID of the eNB 903 that serves the eRelay UE 902.

In some embodiments, during a TAU procedure of the eRemote UE 901, a new MME 904 of the eRemote UE 901 may send one or messages to the MME 904 of the eRelay UE 902 that indicate: a change of MME 904 for the eRemote UE 901 (from an old MME to a new MME), an ID of the new MME of the eRemote UE 901, an ID (S-TMSI. IMSI, GUTI and/or other) of the eRemote UE 901, an ID (S-TMSI, IMSI, GUTI and/or other) of the eRelay UE 902 and/or other information. The MME 904 of the eRelay UE 902 may store the ID of the new MME 904 of the eRemote UE 901 and a new GUTI in an MM context of the eRelay UE 902.

In some embodiments, during a TAU procedure of the eRelay UE 902, a new MME 904 of the eRelay UE 902 may send, to the MME 904 of the eRemote UE 901, one or more messages that indicate: a change of MME 904 for the eRelay UE 902 (from an old MME to a new MME), an ID of the new MME 904 of the eRelay UE 902, an ID (S-TMSI, IMSI, GUTI and/or other) of the eRemote UE 901, an ID (S-TMSI, IMSI, GUTI and/or other) of the eRelay UE 902 and/or other information. The MME 904 of the eRemote UE 901 may store an ID of the new MME 904 of the eRelay UE 902 and a new GUTI in an MM context of the eRemote 901. In some embodiments, if an MME ID for the eRemote UE 901 and/or eRelay UE 902 are not explicitly included, a receiving MME 904 may derive an MME ID based at least partly on a source IP address of a received message.

In Example 1, a User Equipment (UE) may be configurable to operate as an eRelay UE. An apparatus of the UE may comprise memory. The apparatus may further comprise processing circuitry. The processing circuitry may be configured to decode, from an eRemote UE, a PC5 request message for an establishment of a relay arrangement in which the eRelay UE is to operate as a relay between an Evolved Node-B (eNB) and the eRemote UE. The processing circuitry may be further configured to decode, from the eRemote UE, an eRemote UE ID notification message that indicates an identifier of the eRemote UE for paging of the eRemote UE. The processing circuitry may be further configured to store the identifier of the eRemote UE in the memory. The processing circuitry may be further configured to determine whether a first paging message from the eNB includes the identifier of the eRemote UE. The processing circuitry may be further configured to, if it is determined that the first paging message includes the identifier of the eRemote UE: encode, for transmission to the eRemote UE, a second paging message to page the eRemote UE. The second paging message may include the identifier of the eRemote UE.

In Example 2, the subject matter of Example 1, wherein the processing circuitry may be further configured to, if it is determined that the first paging message includes the identifier of the eRemote UE: encode, for transmission to the eRemote UE in accordance with the relay arrangement, one or more data packets received from the eNB.

In Example 3, the subject matter of one or any combination of Examples 1-2, wherein the identifier of the eRemote UE may be an international mobile subscriber identity (IMSI) or a system architecture evolution temporary mobile subscriber identity (S-TMSI).

In Example 4, the subject matter of one or any combination of Examples 1-3, wherein the processing circuitry may be further configured to, if the eRelay UE is in an idle mode when the first paging message is received: determine if the first paging message further includes an identifier of the eRelay UE. The processing circuitry may be further configured to, if the eRelay UE is in an idle mode when the first paging message is received and if it is determined that the first paging message includes the identifier of the eRemote UE and further includes the identifier of the eRelay UE: encode, for transmission to the eRemote UE, the second paging message to page the eRemote UE.

In Example 5, the subject matter of one or any combination of Examples 1-4, wherein the processing circuitry may be further configured to, if the eRelay UE is in a connected mode when the first paging message is received: determine whether to encode the first paging message for transmission to the eRemote UE based on whether the first paging message includes the identifier of the eRemote UE.

In Example 6, the subject matter of one or any combination of Examples 1-5, wherein the relay arrangement may include a sidelink communication between the eRemote UE and the eRelay UE in accordance with a proximity service (ProSe) arrangement.

In Example 7, the subject matter of one or any combination of Examples 1-6, wherein the processing circuitry may be further configured to, as part of the relay arrangement: encode the one or more data packets for transmission to the eRemote UE in accordance with a sidelink communication between the eRemote UE and the eRelay UE.

In Example 8, the subject matter of one or any combination of Examples 1-7, wherein the eRelay UE may be configurable to concurrently support a plurality of relay arrangements with a plurality of eRemote UEs. The processing circuitry may be further configured to determine whether the first paging message includes identifiers of one or more of the eRemote UEs of the plurality of eRemote UEs.

In Example 9, the subject matter of one or any combination of Examples 1-8, wherein the apparatus may further include a transceiver to receive the first paging message.

In Example 10, the subject matter of one or any combination of Examples 1-9, wherein the processing circuitry may include a baseband processor to determine whether the first paging message includes the identifier of the eRemote UE.

In Example 11, a computer-readable storage medium may store instructions for execution by one or more processors to perform operations for communication by a User Equipment (UE). The UE may be configurable to operate as an eRemote UE. The operations may configure the one or more processors to encode, for transmission to an eRelay UE, a PC5 request message for an establishment of a relay arrangement in which the eRelay UE is to operate as a relay between an Evolved Node-B (eNB) and the eRemote UE. The operations may further configure the one or more processors to encode, for transmission to the eRelay UE, an eRemote UE ID notification message that indicates an identifier of the eRemote UE to be used to page the eRemote UE. The operations may further configure the one or more processors to decode, from the eRelay UE, a paging message. The operations may further configure the one or more processors to, if the paging message includes the identifier of the eRemote UE: decode a data packet from the eNB, the data packet received from the eRelay UE in accordance with the relay arrangement.

In Example 12, the subject matter of Example 11, wherein the identifier of the eRemote UE may be an international mobile subscriber identity (IMSI) or a system architecture evolution temporary mobile subscriber identity (S-TMSI).

In Example 13, the subject matter of one or any combination of Examples 11-12, wherein the relay arrangement may include sidelink communication between the eRemote UE and the eRelay UE in accordance with a proximity service (ProSe). The data packet may be further received from the eRelay UE in accordance with the sidelink communication between the eRemote UE and the eRelay UE.

In Example 14, an apparatus of an Evolved Node-B (eNB) may comprise memory. The apparatus may further comprise processing circuitry. The processing circuitry may be configured to encode, for transmission to an eRelay User Equipment (UE), a radio resource control (RRC) message that indicates an identifier of an eRemote UE to be used, by the eNB, to page the eRemote UE. The eNB may be configured to communicate with the eRemote UE through the eRelay UE in accordance with a relay arrangement. The processing circuitry may be further configured to decode, from a mobility management entity (MME), a first paging message that indicates that the eRemote UE is to be paged for reception of one or more downlink data packets. The processing circuitry may be further configured to encode, for transmission to the eRelay UE, a second paging message that includes the identifier of the eRemote UE. The processing circuitry may be further configured to encode the one or more downlink data packets for transmission to the eRelay UE to be forwarded to the eRemote UE in accordance with the relay arrangement.

In Example 15, the subject matter of Example 14, wherein the identifier of the eRemote UE may be an international mobile subscriber identity (IMSI) or a system architecture evolution temporary mobile subscriber identity (S-TMSI).

In Example 16, the subject matter of one or any combination of Examples 14-15, wherein the processing circuitry may be further configured to decode, from the MME, a message that indicates the identifier of the eRemote UE.

In Example 17, the subject matter of one or any combination of Examples 14-16, wherein the processing circuitry may be further configured to, if the eRelay UE operates in an idle mode: encode the second paging message to further include an identifier of the eRelay UE.

In Example 18, the subject matter of one or any combination of Examples 14-17, wherein if the eRelay UE operates in a connected mode, the first paging message may be included in an S1 application protocol (S1-AP) message received from the MME.

In Example 19, the subject matter of one or any combination of Examples 14-18, wherein the one or more downlink data packets may be received by the eNB from a serving gateway (SGW).

In Example 20, the subject matter of one or any combination of Examples 14-19, wherein the eNB may be configurable to concurrently support a plurality of relay arrangements with the eRelay UE and a plurality of eRemote UEs. The processing circuitry may be further configured to encode multiple paging messages for transmission to the eRelay UE to page two or more of the eRemote UEs of the plurality of eRemote UEs.

In Example 21, a User Equipment (UE) may be configurable to operate as an eRemote UE. An apparatus of the UE may comprise means for encoding, for transmission to an eRelay UE, a PC5 request message for an establishment of a relay arrangement in which the eRelay UE is to operate as a relay between an Evolved Node-B (eNB) and the eRemote UE. The apparatus may further comprise means for encoding, for transmission to the eRelay UE, an eRemote UE ID notification message that indicates an identifier of the eRemote UE to be used to page the eRemote UE. The apparatus may further comprise means for decoding, from the eRelay UE, a paging message. The apparatus may further comprise means for, if the paging message includes the identifier of the eRemote UE: decoding a data packet from the eNB, the data packet received from the eRelay UE in accordance with the relay arrangement.

In Example 22, the subject matter of Example 21, wherein the identifier of the eRemote UE may be an international mobile subscriber identity (IMSI) or a system architecture evolution temporary mobile subscriber identity (S-TMSI).

In Example 23, the subject matter of one or any combination of Examples 21-22, wherein the relay arrangement may include sidelink communication between the eRemote UE and the eRelay UE in accordance with a proximity service (ProSe). The data packet may be further received from the eRelay UE in accordance with the sidelink communication between the eRemote UE and the eRelay UE.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for inclusion in a User Equipment (UE), the UE configurable to operate as an eRelay UE, the apparatus comprising: memory; and processing circuitry, configured to:
    decode, from an eRemote UE, a PC5 request message for an establishment of a relay arrangement in which the eRelay UE is to operate as a relay between a base station and the eRemote UE;
    decode, from the eRemote UE, an eRemote UE ID notification message that indicates an identifier of the eRemote UE for paging of the eRemote UE;
    store the identifier of the eRemote UE in the memory;
    determine whether a first paging message from the base station includes the identifier of the eRemote UE;
    in response to a determination that the first paging message includes the identifier of the eRemote UE: encode, for transmission to the eRemote UE, a second paging message to page the eRemote UE, wherein the second paging message includes the identifier of the eRemote UE;
    when the eRelay UE is in an idle mode when the first paging message is received, determine whether the first paging message further includes an identifier of the eRelay UE; and
        in response to a determination that the first paging message includes the identifier of the eRemote UE and further includes the identifier of the eRelay UE, encode, for transmission to the eRemote UE, the second paging message to page the eRemote UE.

2. The apparatus according to claim 1, the processing circuitry further configured to:
    in response to a determination that the first paging message includes the identifier of the eRemote UE:
    encode, for transmission to the eRemote UE in accordance with the relay arrangement, one or more data packets received from the base station.

3. The apparatus according to claim 1, wherein the identifier of the eRemote UE is an international mobile subscriber identity (IMSI) or a system architecture evolution temporary mobile subscriber identity (S-TMSI).

4. The apparatus according to claim 1, the processing circuitry further configured to:
    when the eRelay UE is in a connected mode when the first paging message is received, determine whether to encode the first paging message for transmission to the eRemote UE based on whether the first paging message includes the identifier of the eRemote UE.

5. The apparatus according to claim 1, wherein the relay arrangement includes a sidelink communication between the eRemote UE and the eRelay UE in accordance with a proximity service (ProSe) arrangement.

6. The apparatus according to claim 1, the processing circuitry further configured to, as part of the relay arrangement:
    encode the one or more data packets for transmission to the eRemote UE in accordance with a sidelink communication between the eRemote UE and the eRelay UE.

7. The apparatus according to claim 1, wherein:
    the eRelay UE is configurable to concurrently support a plurality of relay arrangements with a plurality of eRemote UEs,
    the processing circuitry is further configured to:
    determine whether the first paging message includes identifiers of one or more of the eRemote UEs of the plurality of eRemote UEs.

8. The apparatus according to claim 1, wherein the apparatus further includes a transceiver to receive the first paging message.

9. The apparatus according to claim 1, wherein the processing circuitry includes a baseband processor to determine whether the first paging message includes the identifier of the eRemote UE.

10. The apparatus according to claim 1, wherein the identifier of the eRelay UE is an international mobile subscriber identity (IMSI) or a system architecture evolution temporary mobile subscriber identity (S-TMSI).

11. A non-transitory computer-readable storage medium that stores instructions for execution by one or more processors to perform operations for communication by a User Equipment (UE), the UE configurable to operate as an eRelay UE, the instructions to configure the one or more processors to:
  decode, from an eRemote UE, a PC5 request message for an establishment of a relay arrangement in which the eRelay UE is to operate as a relay between a base station and the eRemote UE;
  decode, from the eRemote UE, an eRemote UE ID notification message that indicates an identifier of the eRemote UE for paging of the eRemote UE;
  store the identifier of the eRemote UE in the memory;
  determine whether a first paging message from the base station includes the identifier of the eRemote UE;
  in response to a determination that the first paging message includes the identifier of the eRemote UE: encode, for transmission to the eRemote UE, a second paging message to page the eRemote UE, wherein the second paging message includes the identifier of the eRemote UE;
  when the eRelay UE is in an idle mode when the first paging message is received, determine whether the first paging message further includes an identifier of the eRelay UE; and
    in response to a determination that the first paging message includes the identifier of the eRemote UE and further includes the identifier of the eRelay UE, encode, for transmission to the eRemote UE, the second paging message to page the eRemote UE.

12. The non-transitory computer-readable storage medium according to claim 11, the processing circuitry further configured to:
  in response to a determination that the first paging message includes the identifier of the eRemote UE:
  encode, for transmission to the eRemote UE in accordance with the relay arrangement, one or more data packets received from the base station.

13. The non-transitory computer-readable storage medium according to claim 11, wherein the identifier of the eRemote UE is an international mobile subscriber identity (IMSI) or a system architecture evolution temporary mobile subscriber identity (S-TMSI).

14. The non-transitory computer-readable storage medium according to claim 11, wherein the identifier of the eRemote UE is an international mobile subscriber identity (IMSI) or a system architecture evolution temporary mobile subscriber identity (S-TMSI).

15. The non-transitory computer-readable storage medium according to claim 11,
  when the eRelay UE is in a connected mode when the first paging message is received, determine whether to encode the first paging message for transmission to the eRemote UE based on whether the first paging message includes the identifier of the eRemote UE.

16. The non-transitory computer-readable storage medium according to claim 11,
  wherein the relay arrangement includes a sidelink communication between the eRemote UE and the eRelay UE in accordance with a proximity service (ProSe) arrangement.

17. The non-transitory computer-readable storage medium according to claim 11,
  the instructions to further configure the one or more processors to, as part of the relay arrangement:
  encode the one or more data packets for transmission to the eRemote UE in accordance with a sidelink communication between the eRemote UE and the eRelay UE.

18. The non-transitory computer-readable storage medium according to claim 11, wherein:
  the eRelay UE is configurable to concurrently support a plurality of relay arrangements with a plurality of eRemote UEs,
  the instructions to further configure the one or more processors to:
    determine whether the first paging message includes identifiers of one or more of the eRemote UEs of the plurality of eRemote UEs.

19. A method for communication by a User Equipment (UE), the UE configurable to operate as an eRelay UE, the method comprising:
  decoding, from an eRemote UE, a PC5 request message for an establishment of a relay arrangement in which the eRelay UE is to operate as a relay between a base station and the eRemote UE;
  decoding, from the eRemote UE, an eRemote UE ID notification message that indicates an identifier of the eRemote UE for paging of the eRemote UE;
  storing the identifier of the eRemote UE in the memory;
  determining whether a first paging message from the base station includes the identifier of the eRemote UE;
  in response to determining that the first paging message includes the identifier of the eRemote UE: encoding, for transmission to the eRemote UE, a second paging message to page the eRemote UE, wherein the second paging message includes the identifier of the eRemote UE;
  when the eRelay UE is in an idle mode when the first paging message is received, determining whether the first paging message further includes an identifier of the eRelay UE; and
    in response to determining that the first paging message includes the identifier of the eRemote UE and further includes the identifier of the eRelay UE, encoding, for transmission to the eRemote UE, the second paging message to page the eRemote UE.

20. The method of claim 19, further comprising:
  in response to determining that the first paging message includes the identifier of the eRemote UE:
  encoding, for transmission to the eRemote UE in accordance with the relay arrangement, one or more data packets received from the base station.

* * * * *